(12) United States Patent  
Sabe et al.

(10) Patent No.: US 7,751,937 B2  
(45) Date of Patent: Jul. 6, 2010

(54) BEHAVIOR CONTROL APPARATUS, BEHAVIOR CONTROL METHOD, AND PROGRAM

(75) Inventors: Kohtaro Sabe, Tokyo (JP); Kenichi Hidai, Tokyo (JP)

(73) Assignee: Sony Corporation, Tokyo (JP)

( * ) Notice: Subject to any disclaimer, the term of this patent is extended or adjusted under 35 U.S.C. 154(b) by 1183 days.

(21) Appl. No.: 11/350,825

(22) Filed: Feb. 10, 2006

(65) Prior Publication Data

US 2006/0195227 A1    Aug. 31, 2006

(30) Foreign Application Priority Data

| Feb. 23, 2005 | (JP) | ............................. 2005-047490 |
| Jun. 9, 2005 | (JP) | ............................. 2005-169457 |
| Nov. 30, 2005 | (JP) | ............................. 2005-345847 |

(51) Int. Cl.  
*G06F 19/00* (2006.01)

(52) U.S. Cl. .................................................. 700/245

(58) Field of Classification Search ............. 700/28–29, 700/31, 38, 44, 47–48, 54, 95, 104, 246, 700/250; 706/21, 23, 25  
See application file for complete search history.

(56) References Cited

U.S. PATENT DOCUMENTS

2006/0195409 A1*    8/2006    Sabe et al. ................... 706/16

OTHER PUBLICATIONS

Jun Tani ("Model-Based Learning for Mobile Robot Navigation from the Dynamical Systems Perspective", IEEE Trans, System, Man and Cybernetics (Part B), vol. 26, No. 3, 1996, 421-436).*

U.S. Appl. No. 11/347,227, filed Feb. 6, 2006, Hidai et al.

U.S. Appl. No. 11/350,048, filed Feb. 9, 2006, Sabe et al.

Richard S. Sutton, et al., "Reinforcement Learning: an Introduction", The Mit Press, URL:http://www.cs.ualberta.ca/%7Esutton/book/ebook/the-book.html>, XP-002385586, 2000, 27 pages.

Junshui Ma, et al., "Accurate Online Support Vector Regression", Neural Network Computation, XP-002385587, vol. 15, No. 11, 2003, 29 pages.

Baohua Gu, et al., "Efficiently Determine the Starting Sample Size for Progressive Sampling", Proceedings of the 12$^{th}$ European Conference on Machine Learning, XP-002385588, 2001, pp. 1-7.

(Continued)

*Primary Examiner*—Kim T Nguyen  
(74) *Attorney, Agent, or Firm*—Oblon, Spivak, McClelland, Maier & Neustadt, L.L.P.

(57) ABSTRACT

A behavior control apparatus to control behavior of a device capable of sensing a state of an environment and selecting an action on the basis of a sensing result is provided. The behavior control apparatus includes a predicting unit configured to learn the action and change in the state of the environment and predict change in the state of the environment caused by a predetermined action on the basis of the learning; a planning unit configured to plan a behavior sequence to achieve a goal state from a present state on the basis of the prediction made by the predicting unit; and a control unit configured to control each action of the behavior sequence planned by the planning unit and learn an input/output relationship if the goal state is achieved through the action.

22 Claims, 19 Drawing Sheets

OTHER PUBLICATIONS

Baohua Gu, et al., "Modelling Classification Performance for Large Data Sets, An Empirical Study", Lecture Notes in Computer Science, XP-002385589, vol. 2118, 2001, 12 pages.

Foster Provost, et al., "Efficient Progressive Sampling", Proceedings of the Fifth ACM SIGKDD International Conference on Knowledge Discovery and Data Mining, XP-002385590, 1999, pp. 23-32.

* cited by examiner

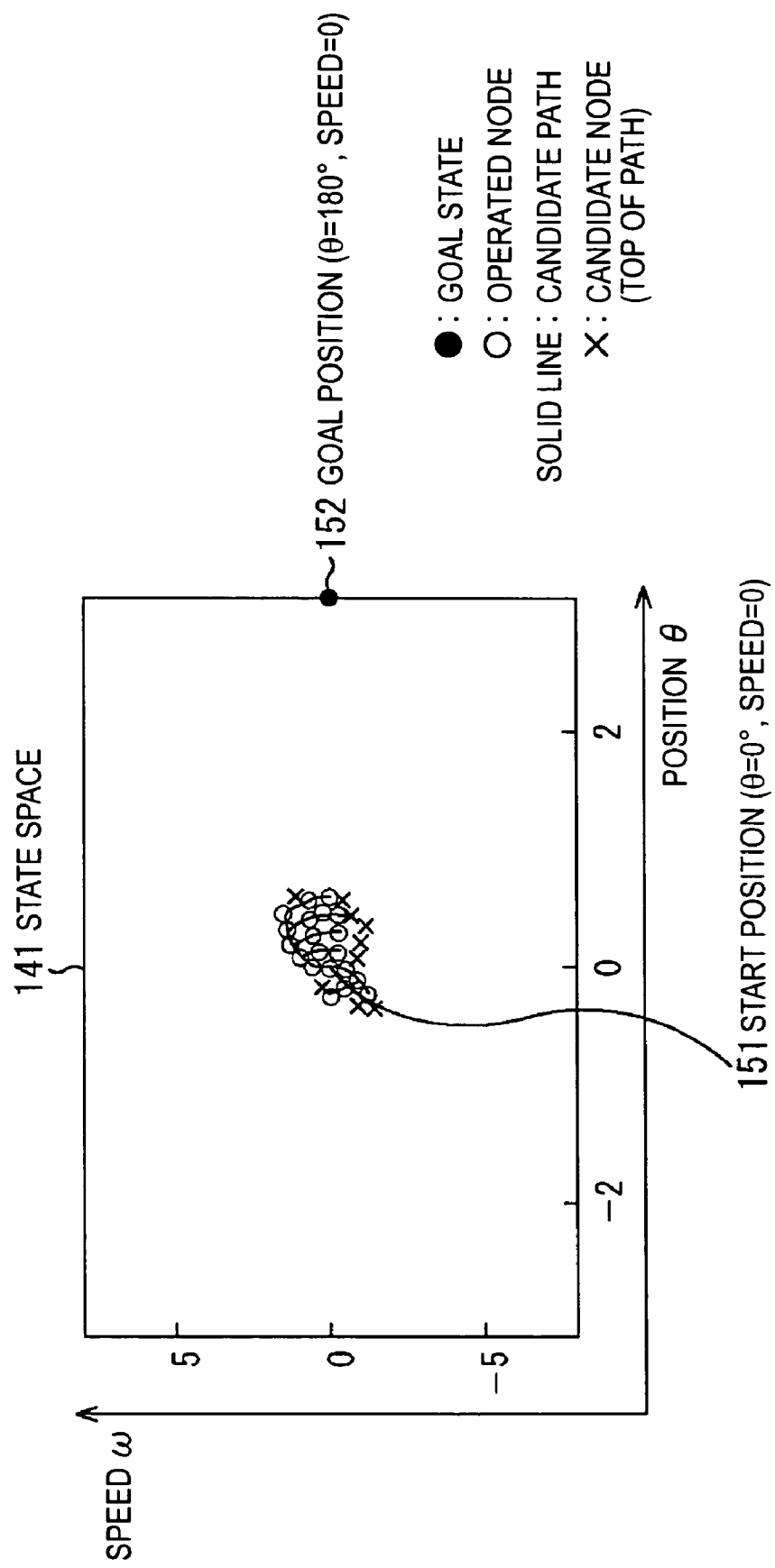

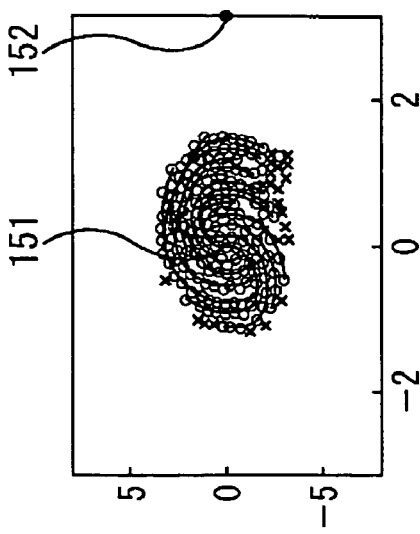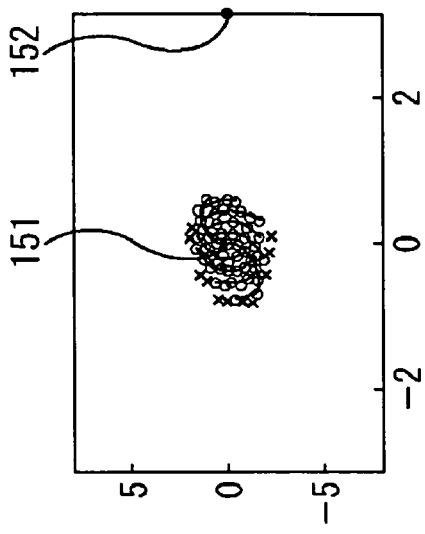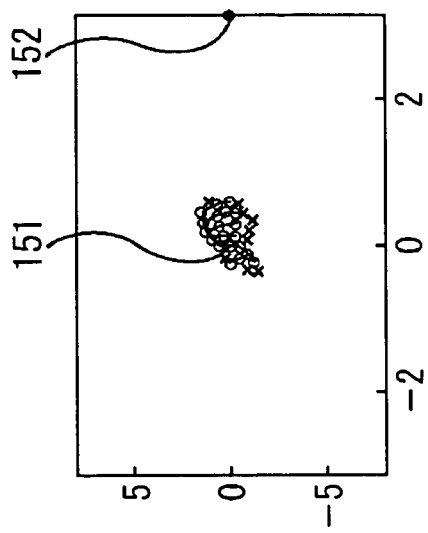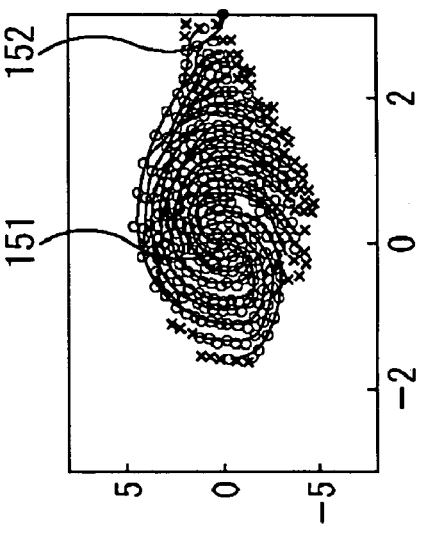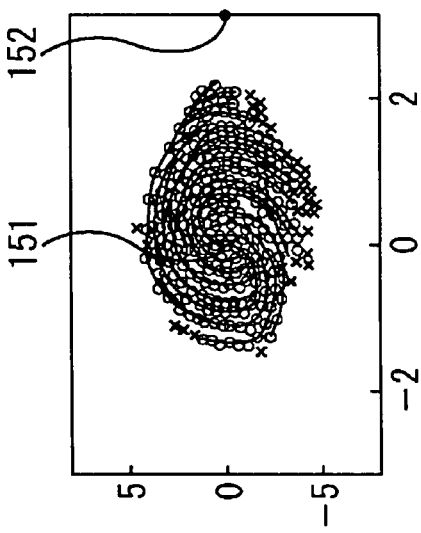

TRIAL 3

TRIAL 2

TRIAL 5

TRIAL 1

TRIAL 4

EXECUTED ACTION SEQUENCE:

OBSERVED SENSOR STATE SEQUENCE:

BEHAVIOR CONTROL APPARATUS, BEHAVIOR CONTROL METHOD, AND PROGRAM

CROSS REFERENCES TO RELATED APPLICATIONS

The present invention contains subject matter related to Japanese Patent Applications JP 2005-047490, JP 2005-169457, and JP 2005-345847 filed in the Japanese Patent Office on Feb. 23, 2005, Jun. 9, 2005, and Nov. 30, 2005, respectively, the entire contents of which are incorporated herein by reference.

BACKGROUND OF THE INVENTION

1. Field of the Invention

The present invention relates to a behavior control apparatus, a behavior control method, and a program. Particularly, the present invention relates to a behavior control apparatus, a behavior control method, and a program that are suitable for controlling autonomous behavior.

2. Description of the Related Art

Machine learning of learning a control method to achieve a goal through trial-and-error by relying only on rewards from an environment is called "reinforcement learning" in a broad sense (e.g., see Nonpatent Document 1: "Reinforcement Learning", written by Richard S. Sutton and Andrew G. Barto, translated into Japanese by Sadayoshi Mikami and Masaaki Minagawa, Dec. 20, 2000, First Edition, Published by Morikita Shuppan Co., Ltd.).

In a problem definition of the reinforcement learning, when a Markov process (the present state depends only on the next previous state) expressed by expression (1) is satisfied in a state space created from a measurement result of a sensor to measure an environment, a state value indicating an expectation value of future reward can be led from a Bellman's optimal equation expressed by expression (2). By selecting an action of the highest value, an optimal action can be taken.

[Expression 1]

$$Pr\{S_{t+1}=s'|S_t=s, a_t=a\} \qquad (1)$$

[Expression 2]

$$V^*(s) = \max_a \sum_{s'} P_{ss'}^a [R_{ss'}^a + \gamma V^*(s')] \qquad (2)$$

SUMMARY OF THE INVENTION

If a change in state caused by an action is known (in other words, if there is a model of a change in state caused by an action), a solution can be obtained by repeatedly sweeping a state space by using dynamic programming or the like. However, if there is no model or if the model is inaccurate, a solution cannot be obtained. Further, if the number of dimensions in a state space increases, the number of states to be swept exponentially increases (so-called "curse of dimensionality" occurs), so that the capacity of a memory required for operation and the time required for operation become extraordinary.

Under these circumstances, there is suggested Q-learning, in which an action value in each state is defined by giving a discounted reward to an action taken in each state while actions being actually taken, and an optimal action is taken by selecting an action of a maximum value in that state.

The following expression (3) expresses a learning rule of Q-learning, whereas expression (4) expresses an action selecting rule.

[Expression 3]

$$Q(s_t, a_t) \leftarrow Q(s_t, a_t) + \alpha[r_{t+1} + \gamma \max Q(s_{t+1}, a) - Q(s_t, a_t)] \qquad (3)$$

[Expression 4]

$$a_t = \arg\max Q(s_t, a) \qquad (4)$$

The Q-learning is applied to various tasks because learning can be performed by using an actual environment as a supervisor without defining any model in advance. However, in the Q-learning, much reward and many trials are required to obtain a solution. Since a prediction model and action control are not separated, the same agent needs to learn from a first step in order to solve a task different from an already learned task. Further, the Q-learning has the same problem as that of dynamic programming in that sufficient trials cannot be done in a real agent if a state space is large.

In contrast, in actor-critic learning, a critic learns expected reward and an actor improves actions on the basis of an error of expected reward (TD error). In this learning method, supervised learning such as a neural network is used, and thus a large number of states can be dealt with. However, this learning method may cause a problem of falling into a local solution or delayed convergence.

Considering a human thinking pattern of performing intellectual activities, when someone wants to achieve a goal, he/she plans in head how to combine his/her knowledge and skills (prediction models) and how to execute them in which order (performs rehearsal using prediction models), and then actually take actions on the basis of the plan. In human behavior, if the plan could not be successfully done (if a goal could not be achieved), he/she can often improve his/her skill by repeating the same sequence.

The emergence of such a behavior pattern is completely different from a behavior pattern of a case where the entire state space gradually and asymptotically approaches a solution in reinforcement learning. How humanly a problem should be solved is an important factor when the behavior of an intellectual agent contacting people is designed.

The present invention has been made in view of these circumstances and is directed to generating a behavior sequence capable of achieving a goal by efficiently searching a vast state space.

A behavior control apparatus according to an embodiment of the present invention includes a predicting unit configured to learn an action and change in a state of an environment and predict change in the state of the environment caused by a predetermined action on the basis of the learning; a planning unit configured to plan a behavior sequence to achieve a goal state from a present state on the basis of the prediction made by the predicting unit; and a control unit configured to control each action of the behavior sequence planed by the planning unit and learn an input/output relationship if the goal state is achieved through the action.

The behavior control apparatus may further include a goal state giving unit configured to give a goal state in accordance with a task to the planning unit.

The predicting unit may learn the action and change in the state of the environment in both cases where the goal state is achieved and is not achieved by the action controlled by the control unit in accordance with the behavior sequence planned by the planning unit.

The predicting unit may use function approximation in the learning.

The control unit may use function approximation to learn the input/output relationship.

The above-mentioned function approximation may be support vector regression.

The planning unit may plan the behavior sequence by using a method of heuristic search.

The method of heuristic search may be A*search.

The control unit may receive input of a present environment and the goal state and output the action. The planning unit may plan the behavior sequence on the basis of the action output from the control unit.

The planning unit may add predetermined one or more perturbations to the action output from the control unit to generate samples and use the samples as action options for search.

The planning unit may use the perturbations based on probability distribution in which zero is a peak.

The planning unit may set a dispersion value of the probability distribution in accordance with the progress in learning by the control unit.

The planning unit may compare a first environment predicted to be obtained through respective actions of the behavior sequence that is planned previous time with a second environment predicted to be obtained through the actions output from the control unit in response to input of the environment and the goal state, calculate dispersion of errors between the first and second environments, decrease a dispersion value of the probability distribution if the dispersion of the errors is smaller than a predetermined threshold, and increase the dispersion value of the probability distribution if the dispersion of the errors is larger than the predetermined threshold.

The planning unit may compare a first environment predicted to be obtained through respective actions of the behavior sequence that is planned previous time with a second environment predicted to be obtained through the actions output from the control unit in response to input of the environment and the goal state, calculate an integrated value of errors between the first and second environments, and set a dispersion value of the probability distribution to a value proportional to the integrated value of the errors.

The planning unit may calculate an error between a first environment predicted to be obtained as a result of execution of the behavior sequence that is planned previous time and a second environment predicted to be achieved as a result of change in the environment predicted by the predicting unit on the basis of the action output from the control unit, decrease a dispersion value of the probability distribution if the error is smaller than a predetermined threshold, and increase the dispersion value of the probability distribution if the error is larger than the predetermined threshold.

The planning unit may calculate an error between a first environment predicted to be obtained as a result of execution of the behavior sequence that is planned previous time and a second environment predicted to be achieved as a result of change in the environment predicted by the predicting unit on the basis of the action output from the control unit, and set a dispersion value of the probability distribution to a value proportional to the error.

A behavior control method according to an embodiment of the present invention is a behavior control method for a behavior control apparatus to control behavior of a device capable of sensing a state of an environment and selecting an action on the basis of a sensing result. The behavior control method includes the steps of: learning the action and change in the state of the environment; planning a behavior sequence to achieve a goal state from a present state by using prediction based on the learning in the learning step; controlling each action of the behavior sequence planned in the planning step; and learning an input/output relationship if the goal state is achieved through the action controlled in the controlling step.

A program according to an embodiment of the present invention is a program allowing a computer to execute a process of controlling behavior of a device capable of sensing a state of an environment and selecting an action on the basis of a sensing result. The computer is allowed to execute the steps of: learning the action and change in the state of the environment; planning a behavior sequence to achieve a goal state from a present state by using prediction based on the learning in the learning step; controlling each action of the behavior sequence planned in the planning step; and learning an input/output relationship if the goal state is achieved through the action controlled in the controlling step.

In an embodiment of the present invention, an action and an environment are obtained, change in the states thereof is learned, change in the state of the environment caused by a predetermined action is predicted on the basis of the learning, a behavior sequence to achieve a goal state from a present state is planned on the basis of the prediction, and each action is controlled on the basis of the planned behavior sequence. If the goal state is achieved through the action, an input/output relationship thereof is learned.

According to an embodiment of the present invention, behavior can be controlled, predictive learning can be performed while being released from curse of dimensionality, and autonomous behavior can be controlled. If the autonomous behavior is successfully done, input/output of the success can further be learned.

BRIEF DESCRIPTION OF THE DRAWINGS

FIG. 7 illustrates repetition of planning and execution;
FIGS. 8A to 8E illustrate repetition of planning and execution.

DESCRIPTION OF THE PREFERRED EMBODIMENTS

Figure 1:
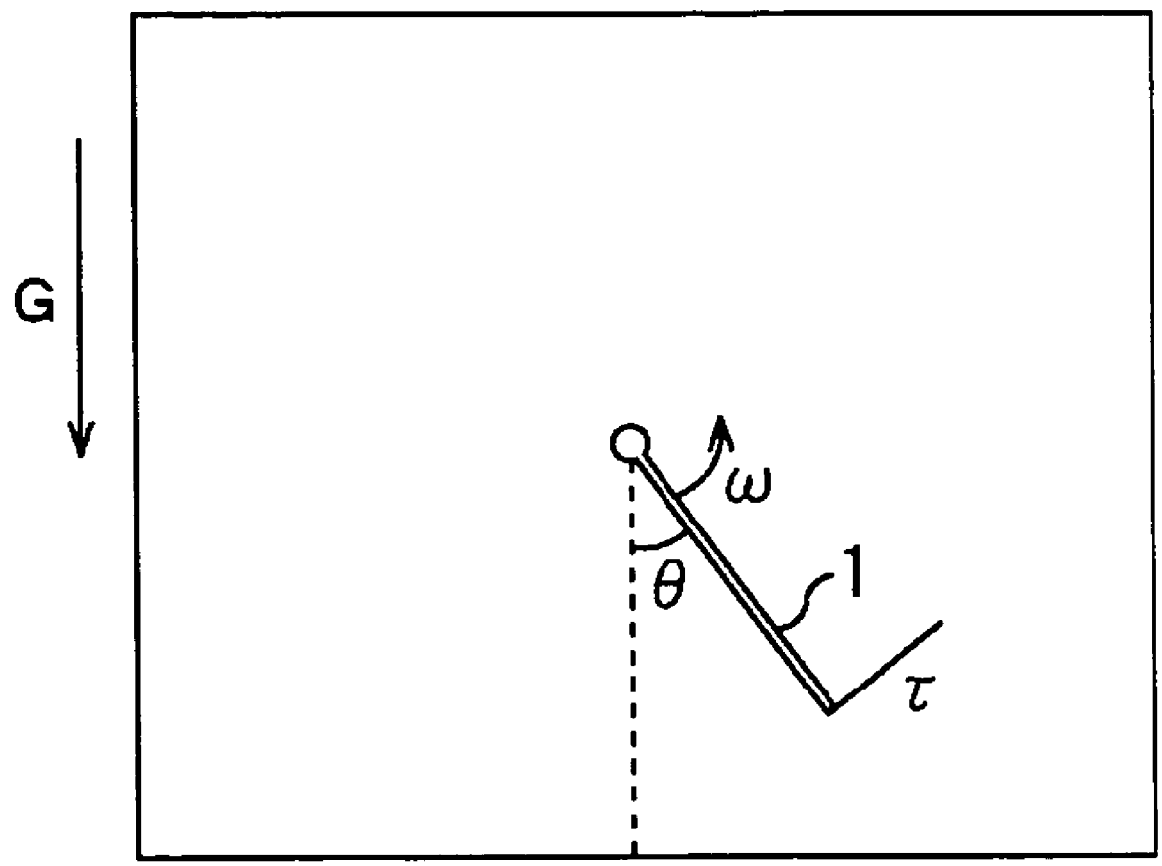
FIG. 1 shows the configuration of an autonomous agent.

Before describing embodiments of the present invention, the correspondence between the features of the present invention and embodiments disclosed in the specification or drawings is discussed below. This description is intended to assure that embodiments supporting the invention are described in the specification or drawings. Thus, even if an element in the following embodiments or drawings is not described as relating to a certain feature of the present invention, that does not necessarily mean that the element does not relate to that feature. Conversely, even if an element is described herein as relating to a certain feature, that does not necessarily mean that the element does not relate to other features.

Furthermore, this description should not be construed as restricting that all the aspects of the invention corresponding to specific examples described in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A behavior control apparatus according to an embodiment of the present invention includes a predicting unit (e.g., the Fwd model 131 shown in FIG. 6) configured to learn an action and change in a state of an environment and predict change in the state of the environment caused by a predetermined action on the basis of the learning; a planning unit (e.g., the planner 133 shown in FIG. 6) configured to plan a behavior sequence to achieve a goal state from a present state on the basis of the prediction made by the predicting unit; and a control unit (e.g., the controller 134 shown in FIG. 6) configured to control each action of the behavior sequence planed by the planning unit and learn an input/output relationship if the goal state is achieved through the action.

The behavior control apparatus may further include a goal state giving unit (e.g., the goal generator 132 shown in FIG. 6) configured to give a goal state in accordance with a task to the planning unit.

The control unit (e.g., the controller 202 shown in FIG. 14) can receive input of a present environment and a goal state and output an action (e.g., an action output value at). The planning unit (e.g., the planner 201 shown in FIG. 14) can plan a behavior sequence on the basis of the action output from the control unit.

The planning unit can add predetermined one or more perturbations to the action output from the control unit to generate samples and use the samples as action options (e.g., an action output value $a_t'$ shown in expression (14)) for search.

The planning unit can use perturbations based on probability distribution in which 0 is peak (e.g., the normal distribution described with reference to expression (13) and FIG. 15).

The planning unit can compare a first environment predicted to be obtained through respective actions of the behavior sequence that is planned previous time (e.g., the behavior sequence ap shown in FIG. 16) with a second environment predicted to be obtained through the actions (e.g., the actions ac shown in FIG. 16) output from the control unit in response to input of the environment and the goal state, calculate dispersion of errors (e.g., $\alpha_1$ to $\alpha_n$ shown in FIG. 16) between the first and second environments, decrease a dispersion value of the probability distribution if the dispersion of the errors is smaller than a predetermined threshold, and increase the dispersion value of the probability distribution if the dispersion of the errors is larger than the predetermined threshold.

The planning unit can compare a first environment predicted to be obtained through respective actions of the behavior sequence that is planned previous time (e.g., the behavior sequence ap shown in FIG. 16) with a second environment predicted to be obtained through the actions (e.g., the actions ac shown in FIG. 16) output from the control unit in response to input of the environment and the goal state, calculate an integrated value of errors (e.g., $\alpha_1$ to $\alpha_n$ shown in FIG. 16) between the first and second environments, and set a dispersion value of the probability distribution to a value proportional to the integrated value of the errors.

The planning unit can calculate an error (e.g., $\beta$ shown in FIG. 17) between a first environment (e.g., the state $S_n$ shown in FIG. 17) predicted to be obtained as a result of execution of the behavior sequence that is planned previous time and a second environment (e.g., the state $SC_n$ shown in FIG. 17) predicted to be achieved as a result of change in the environment predicted by the predicting unit on the basis of the action output from the control unit, decrease a dispersion value of the probability distribution if the error is smaller than a predetermined threshold, and increase the dispersion value of the probability distribution if the error is larger than the predetermined threshold.

The planning unit can calculate an error (e.g., $\beta$ shown in FIG. 17) between a first environment (e.g., the state $S_n$ shown in FIG. 17) predicted to be obtained as a result of execution of the behavior sequence that is planned previous time and a second environment (e.g., the state $SC_n$ shown in FIG. 17) predicted to be achieved as a result of change in the environment predicted by the predicting unit on the basis of the action output from the control unit, and set a dispersion value of the probability distribution to a value proportional to the error.

Figure 6:
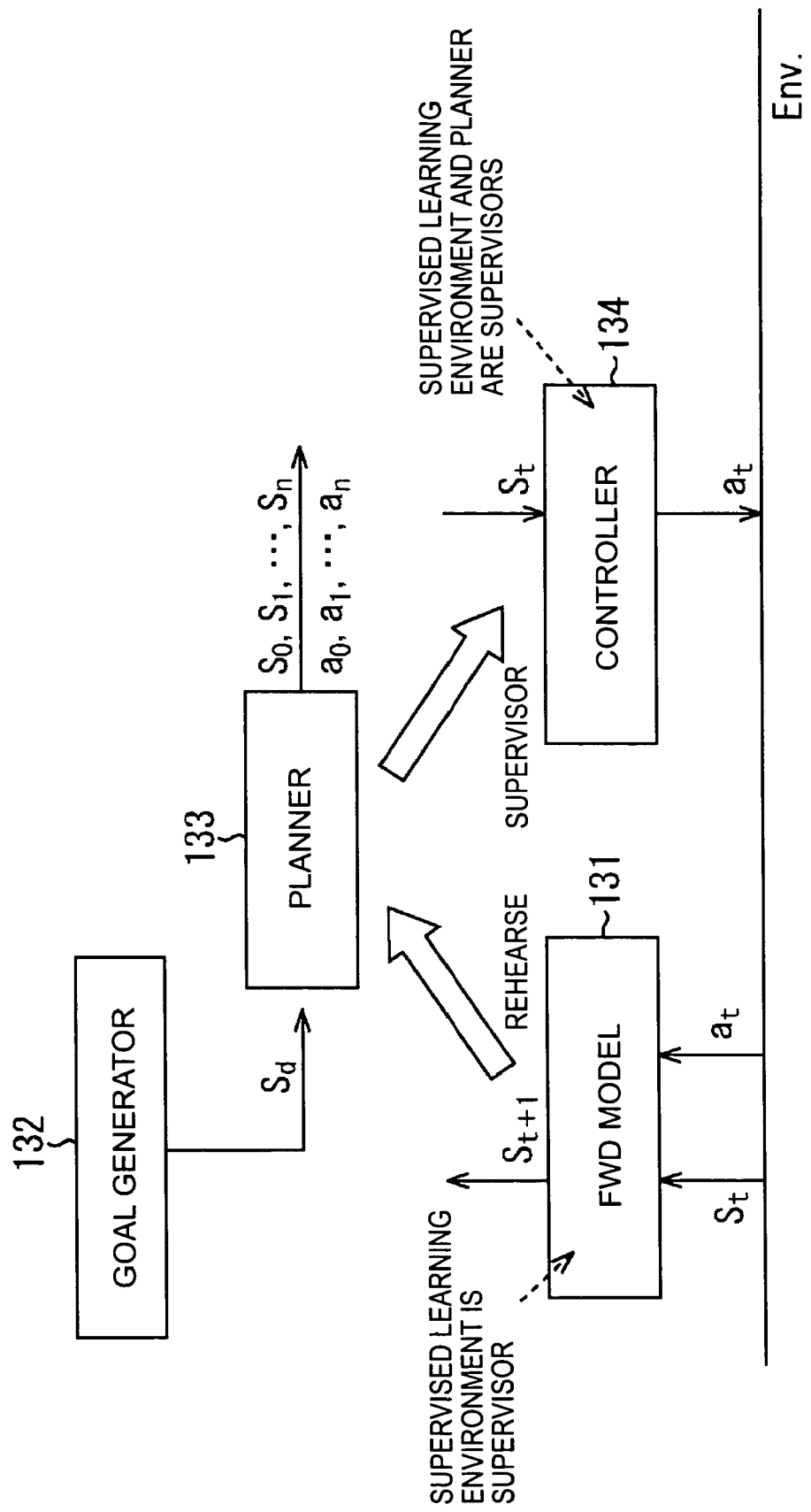
FIG. 6 shows an example of a basic configuration of an autonomous behavior control model.
Figure 13:
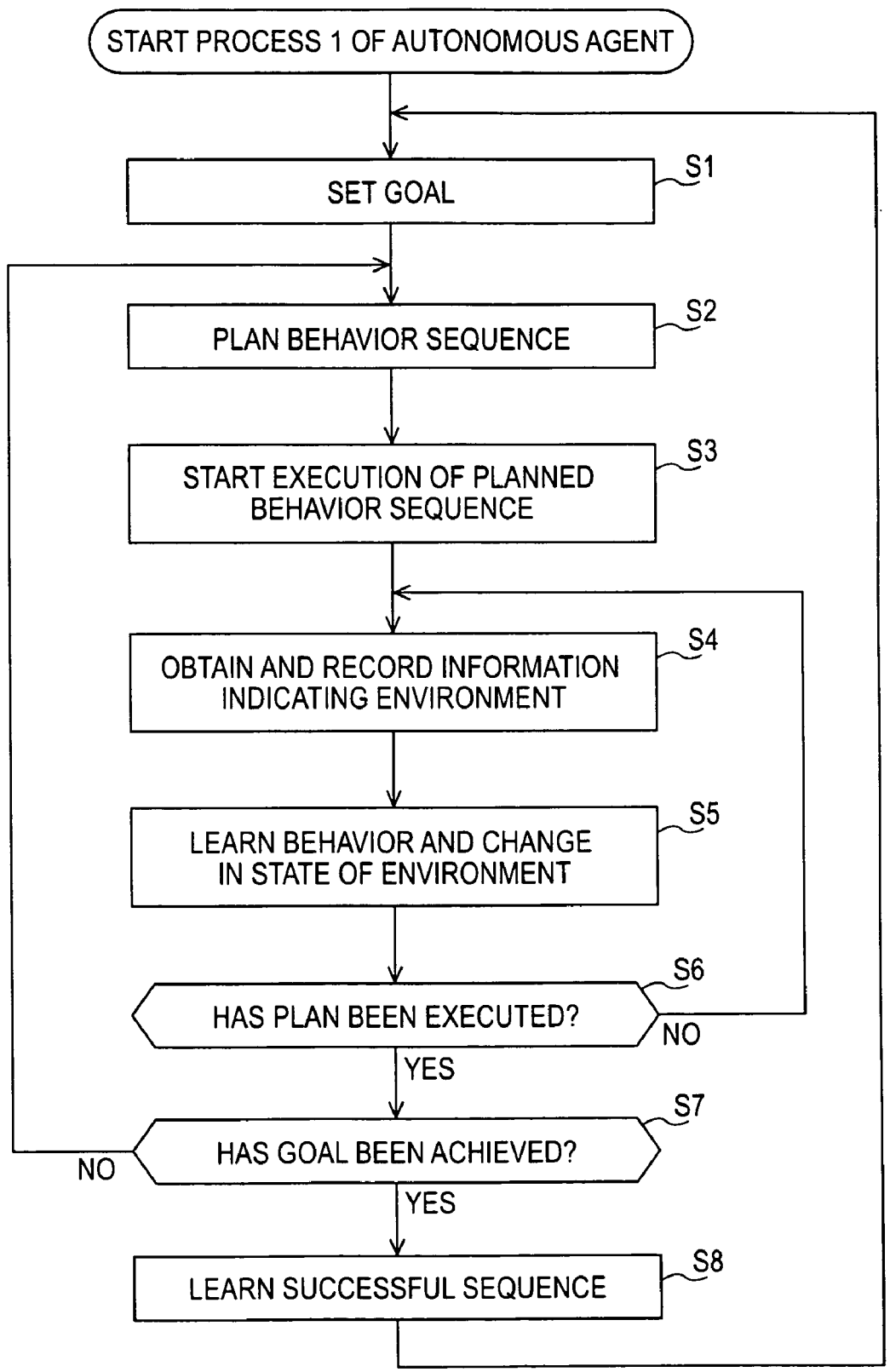
FIG. 13 is a flowchart illustrating a process 1 executed by the autonomous agent according to an embodiment of the present invention.

A behavior control method or a program according to an embodiment of the present invention includes the steps of: learning an action and change in a state of an environment (e.g., step S5 in FIG. 13 executed by the Fwd model 131 shown in FIG. 6); planning a behavior sequence to achieve a goal state from a present state by using prediction based on the learning in the learning step (e.g., step S2 in FIG. 13 executed by the planner 133 shown in FIG. 6); controlling each action of the behavior sequence planned in the planning step (e.g., step S3 in FIG. 13 executed by the controller 134 shown in FIG. 6); and learning an input/output relationship if the goal state is achieved through the action controlled in the controlling step (e.g., step S8 in FIG. 13 executed by the controller 134 shown in FIG. 6).

Hereinafter, embodiments of the present invention are described with reference to the drawings.

In a field of classical robotics or artificial intelligence, success is achieved in a method of obtaining a solution by performing search while considering possible actions to be taken from a present state to a goal state by using heuristic search to generate a path or trajectory in a movement or action of an entire or part of a mobile robot or an articulated robot.

This method is advantageous in that movement models of a robot or kinematics and dynamics of joints can be known in advance. In this field, a calculating method for efficiently obtaining a solution even in a vast state space (=operation space), while considering the attitude of a robot, has been developed.

On the other hand, in a field of pattern recognition, many algorithms for learning machines having a great generalization ability, such as a support vector machine (SVM) and AdaBoost, have been suggested in recent years. These learning machines are good at dealing with input of high dimension, such as images and voices, and are used as an application of existing pattern learning using a neural network or the like.

The present invention aims to generate a desirable behavior sequence by efficiently searching a vast state space using heuristic search while using a pattern learning machine, such as a support vector machine (SVM), in prediction and learning of control, in order to be released from curse of dimensionality. Such a sequence is based on the above-described human thinking pattern and can be easily understood by people. Thus, a solution can be obtained in practical time.

Typically, an "agent" is an autonomous entity that is capable of sensing a state of an environment and selecting an action to be taken on the basis of the sensing result.

Herein, a simple robot having a joint and a link that rotates by being applied with a torque (rotation moment) is used as an autonomous agent. FIG. 1 shows an example of the configuration of the autonomous agent.

An output of the autonomous agent 1 is torque ($\tau$) applied to the joint. As an input to the autonomous agent 1, a present angle ($\theta$) and angular velocity ($\omega$) can be observed. Also, gravity (the direction in which $\theta=0°$) exists in this environment. Since the torque is smaller than the gravity, the autonomous agent 1 cannot raise itself completely upward ($\theta=\pi$ (180°)) even if a maximum torque is applied thereto in a predetermined direction.

The autonomous agent 1 shown in FIG. 1 can be expanded to have an internal state. For example, two parameters: energy and lactic acid, can be given as an internal state of the autonomous agent 1. Energy decreases in proportion to the amount of applied torque. When the autonomous agent 1 reaches a certain position ($\theta E$), the energy is added and increased. Lactic acid increases in proportion to the amount of consumed energy, and is constantly decomposed little by little so as to be decreased. The autonomous agent 1 cannot output torque when the energy is burned out or the level of lactic acid reaches the maximum.

Figure 2:
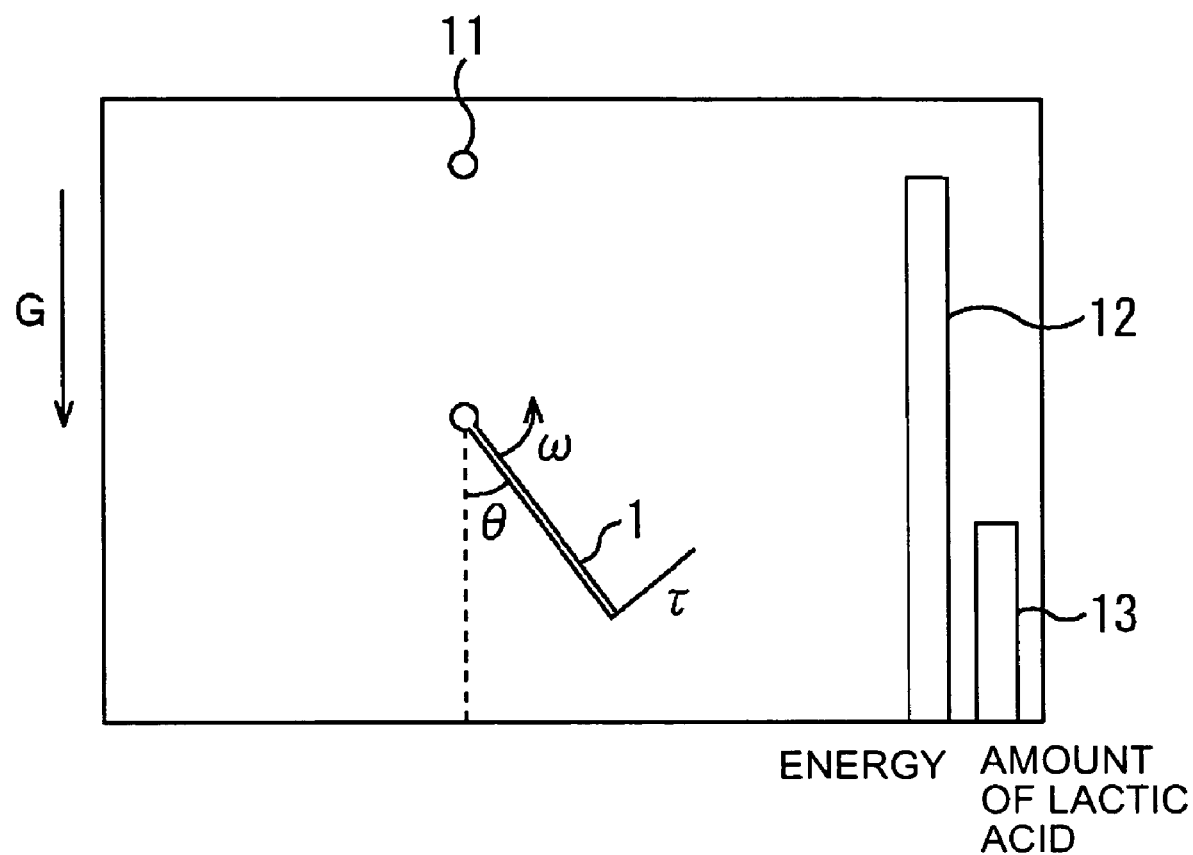
FIG. 2 illustrates an internal state of the autonomous agent.

FIG. 2 shows the autonomous agent 1 having an internal state and an energy feeding point (bait 11). In FIG. 2, energy (E) 12 and an amount of lactic acid (L) 13 are given as the internal state of the autonomous agent 1. The bait 11 is provided at a certain position ($\theta E$).

In this specification, an embodiment of such a simplified virtual agent is described. However, the present invention can be applied to any agent as long as the agent can take an action to the outside world and can sense the outside world.

Figure 3:
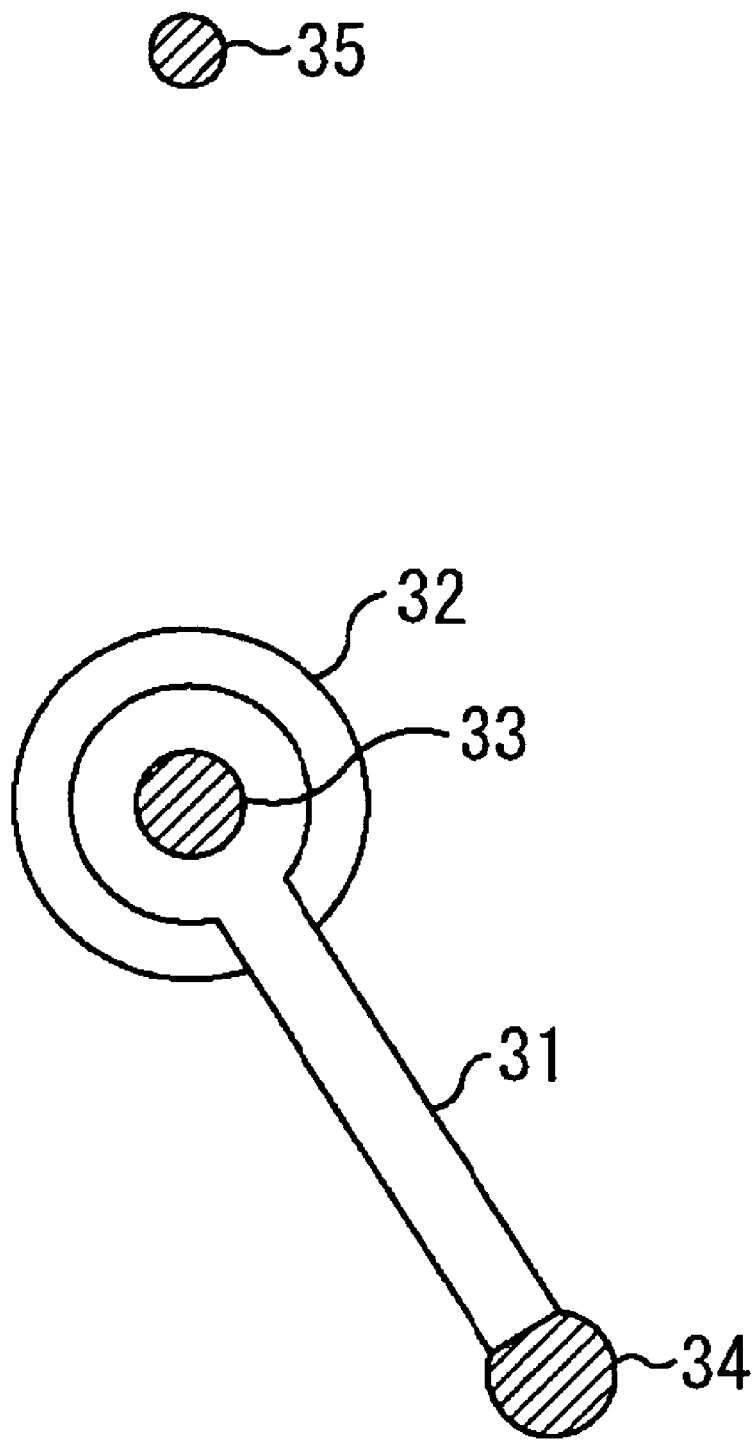
FIG. 3 illustrates an example of the configuration of the autonomous agent shown in FIG. 2.

FIG. 3 shows an example of a specific configuration of the autonomous agent 1 described with reference to FIG. 2. Herein, the autonomous agent 1 takes an action by being provided with torque on the basis of a plan and obtains an environment.

The autonomous agent 1 has an arm 31 of a predetermined length. The arm 31 is driven to rotate by a DC motor 32. That is, the above-mentioned torque corresponds to rotational torque of the DC motor 32. A rotation angle of the arm 31 is measured by a potentiometer 33. Additionally, a spindle of a predetermined weight may be attached to the top of the arm 31.

As described above, the arm 31 cannot be raised completely upward ($\theta=180°$) only with a unidirectional maximum torque generated by the DC motor 32. That is, the arm 31 is raised completely upward when the acceleration applied to the arm 31 at a predetermined angle by the gravity and the torque applied to the arm 31 by the DC motor 32 satisfy a predetermined condition.

The potentiometer 33 includes a variable resistor or the like. Since the resistance thereof changes in accordance with the angle of the arm 31, the potentiometer 33 can detect the angle of the arm 31.

A light shield 34 is provided at the top of the arm 31. When the light shield 34 reaches the position of a photosensor 35, which corresponds to the position of the bait 11, and when the speed becomes zero (that is, $\theta=\pi$ and $\omega=0$), the photosensor 35 is not radiated with any external light. That is, when the photosensor 35 does not detect any external light, that means the autonomous agent 1 has reached the bait 11.

Figure 4:
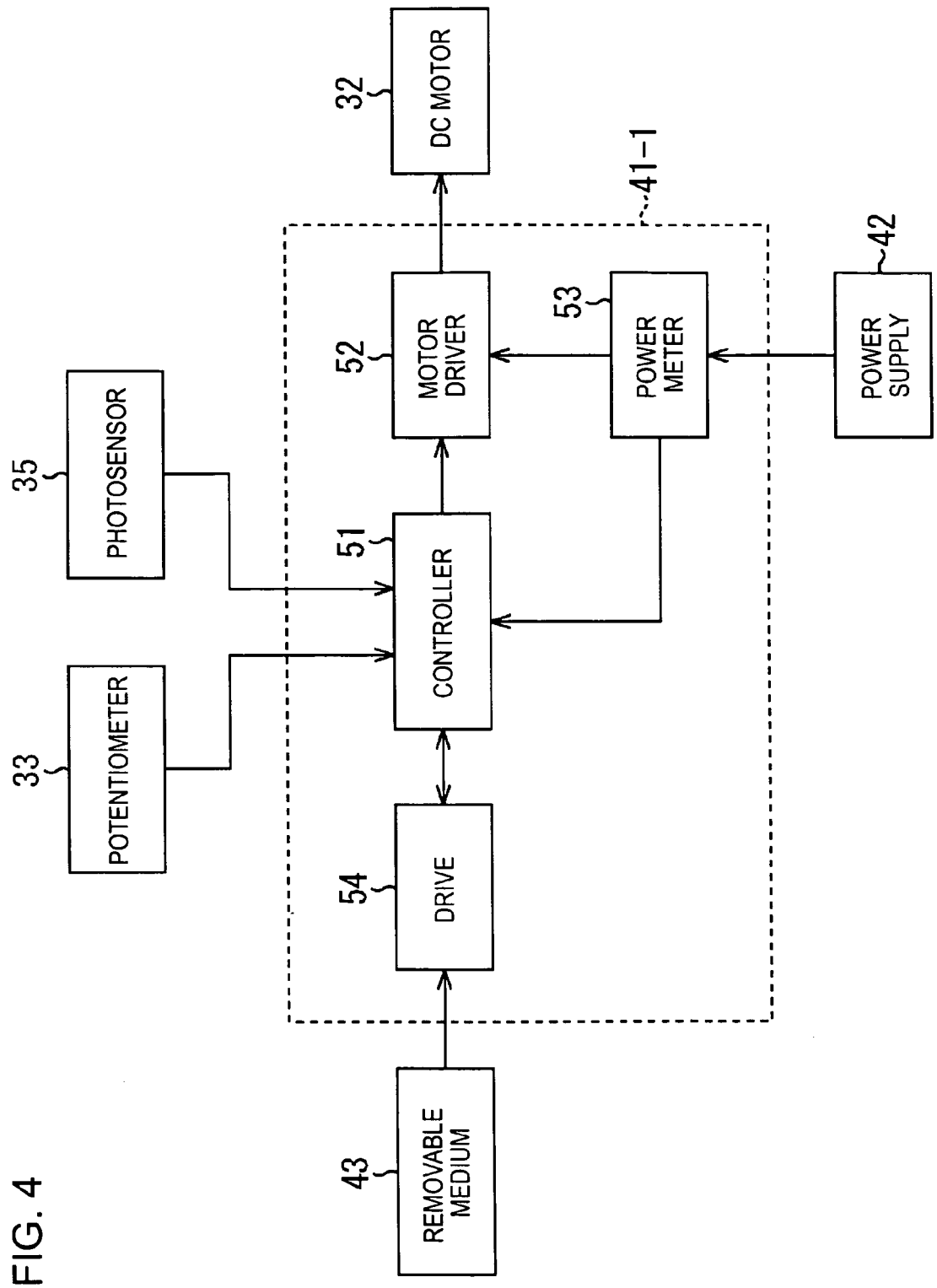
FIG. 4 illustrates an example of the configuration of a controller to control the autonomous agent having an arm shown in FIG. 3.

FIG. 4 is a block diagram showing an example of the configuration of a control unit 41-1 to control the autonomous agent 1, which has the arm 31 described with reference to FIG. 3.

A controller 51 controls a motor driver 52 to drive the DC motor 32, so as to operate the arm 31. The controller 51 can observe a present angle ($\theta$) of the arm 31 on the basis of an input from the potentiometer 33, detect angular velocity ($\omega$) on the basis of the angle, and detect whether the autonomous agent 1 has obtained the bait 11 existing at the certain position ($\theta E$) on the basis of an input from the photosensor 35. The controller 51 learns behavior, that is, actions of the arm 31 and an ambient environment, and plans behavior on the basis of the actions and environment. The details of planning behavior will be described below. Also, the controller 51 controls the motor driver 52 on the basis of the planned behavior and allows the motor driver 52 to drive the DC motor 32 so as to allow the arm 31 to execute the planned behavior.

The amount of power that is supplied from a power supply 42 and is consumed by the driven DC motor 32 is measured by a power meter 53, and the measurement result is supplied to the controller 51. The controller 51 can calculate the energy that decreases in proportion to the amount of applied torque and the lactic acid that increases in proportion to the consumed energy and that is constantly decomposed little by little and decreases, on the basis of the measurement result of the amount of consumed power supplied from the power meter 53.

In other words, the energy and the amount of lactic acid shown in FIG. 2 are calculated by the controller 51 on the basis of the amount of consumed power supplied from the power meter 53 and an input from the photosensor 35.

Further, the controller 51 connects to a drive 54 as necessary. A removable medium 43, such as a magnetic disk, an optical disc, a magneto-optical disc, or a semiconductor memory, is loaded onto the drive 54, so that information can be transmitted/received to/from the controller 51.

Whether the autonomous agent 1 has obtained the bait 11 can be detected in a method other than the method using the photosensor 35. An example of such a method is described below with reference to FIG. 5.

Figure 5:
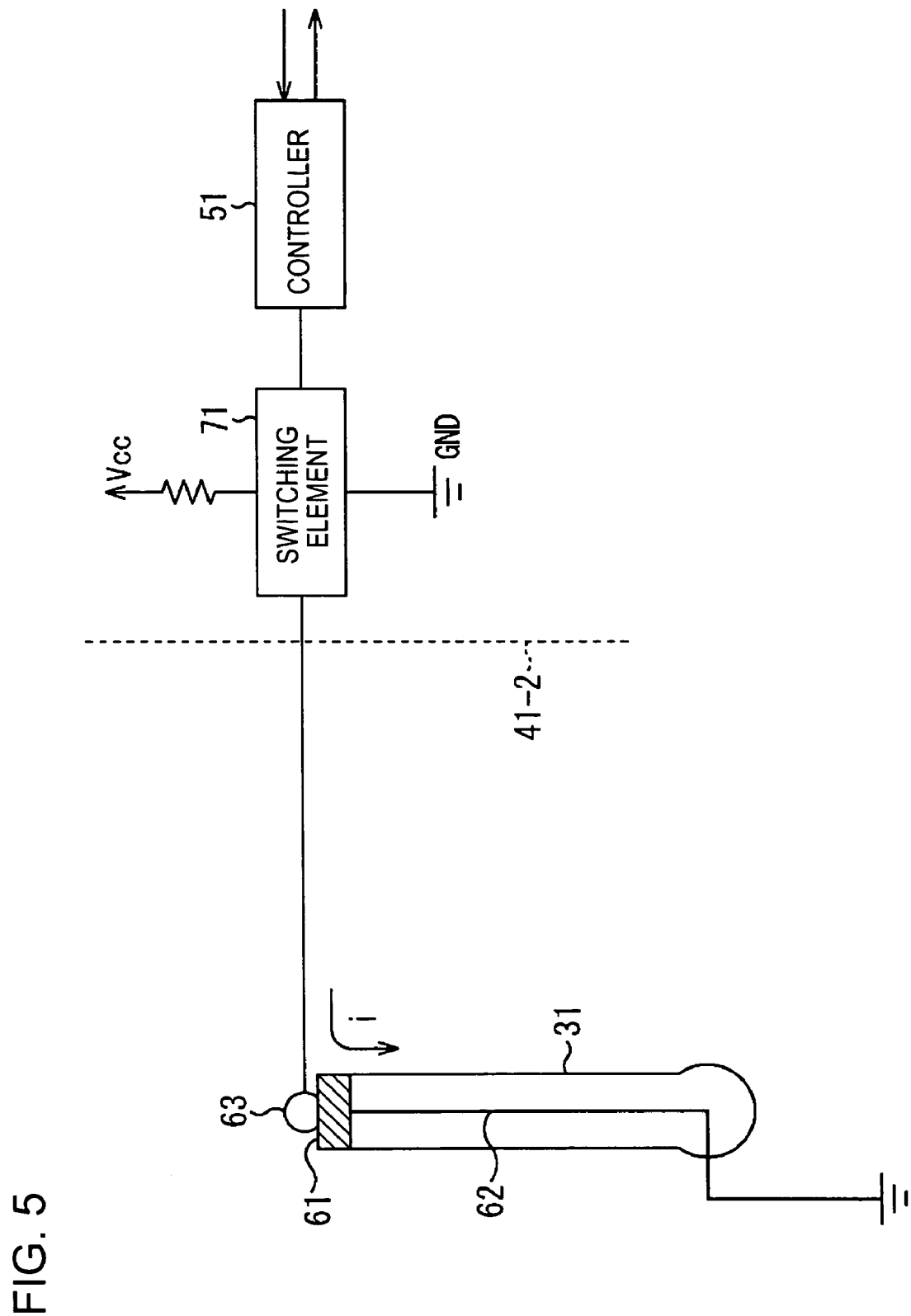
FIG. 5 illustrates another example of the configuration of the controller to control the autonomous agent having the arm shown in FIG. 3.

For example, as shown in FIG. 5, a conductive unit 61 is provided at the top of the arm 31 of the autonomous agent 1 and the conductive unit 61 is grounded through an electric wire 62. When the conductive unit 61 of the arm 31 touches a conductive terminal 63, which is set at a position corresponding to the position of the bait 11, a switching element 71 provided in a control unit 41-2 is energized. The switching element 71 connects to the controller 51, so that the controller 51 can detect switching of the switching element 71, that is, detect that the arm 31 has reached the bait 11.

FIG. 6 shows a functional configuration of the controller 51 shown in FIG. 4 or 5, that is, an example of a basic configuration of an autonomous behavior control model of the autonomous agent 1. The autonomous behavior control mode mainly includes four modules: a forward (Fwd) model 131, a goal generator 132, a planner 133, and a controller 134. In the figure, "Env." means an environment.

The Fwd model 131 constantly predicts the value of a sensor input of time t+1 with reference to an action $a_t$ taken by the autonomous agent 1 at time t and a sensor input $S_t$ at time t (the environment where the autonomous agent 1 exists). In other words, the Fwd model 131 performs predictive learning by using the environment as a supervisor. The Fwd model 131 uses a function approximator based on statistical learning in the predictive learning.

The goal generator 132 gives a goal state in accordance with a pre-designed task (e.g., allowing the arm 31 to reach the position of the bait 11) to the planner 133.

The planner 133 plans a behavior sequence from the present state to the goal state. In the planning, a searching method using the Fwd model 131 is adopted. That is, transition of the state caused when a selected action is taken is predicted, and then an action is further selected. After a plan to achieve the goal can be generated, the behavior sequence including one or more actions is executed in the order.

The controller 134 learns by using the plan generated by the planner 133 and the environment as supervisors and controls each action of the autonomous agent 1. If the action of the autonomous agent 1 succeeded, the controller 134 learns the input/output relationship thereof, that is, a sensor input indicating the environment of the autonomous agent 1 in the successful sequence executed to the given goal and the action actually taken.

In other words, if the executed plan succeeded, the controller 134 learns the input/output relationship of the observed state and the selected action, while the goal state being a fixed input. Accordingly, the controller 134 can learn the plan generated by the planner 133 as a pattern. Further, by continuously learning, the controller 134 obtains a function of automatically generating actions by being provided with a goal.

The controller 134 can perform such learning by using a goal state as a parameter. In this case, a goal state generated by the goal generator 132 is successively changed and a plan is repeatedly created and executed. Accordingly, the controller 134 can experience various successful sequences. At this time, the controller 134 learns an input/output relationship in which the goal state and the environment are input and an action is output.

The controller 134 uses a function approximator based on statistical learning in the above-described learning.

Hereinafter, learning performed by the Fwd model 131 is described.

In the learning performed by the Fwd model 131, a function approximator based on statistical learning is used. As the function approximator, SVR (support vector regression) described in "Support Vector Machine (SVM), Advances in Kernel Methods Support Vector Learning, The MIT Press, 1997" is used, for example.

One classification of the SVM is SVR of performing regression estimation. The SVM is machine learning that is suggested as a learning algorithm to solve a classification problem. In order to solve a classification problem, the SVM extracts data that is important for classification (called a support vector) from learning data, and constitutes a discrimination plane on the basis of the data. In the SVR, this characteristic is applied to a regression problem.

In the autonomous agent 1 described above with reference to FIG. 2, observed state variables are represented by $S=(\theta, \omega, E, L)$, and an action that can be taken thereby is represented by $A=(\tau)$. Therefore, in predictive learning performed by the Fwd model 131, functions of difference equations expressed by the following expressions (5) to (8) to predict respective variables at time t+1 on the basis of the variables at time t are estimated. In other words, the Fwd model 131 does not directly predict the respective variables at time t+1 but predicts variations ($\Delta\theta, \Delta\omega, \Delta E, \Delta L$) of these variables.

[Expression 5]

$$\theta_{t+1} - \theta_t = f_\theta(\theta_t, \omega_t, E_t, L_t, \tau_t) \tag{5}$$

[Expression 6]

$$\omega_{t+1} - \omega_t = f_\omega(\theta_t, \omega_t, E_t, L_t, \tau_t) \tag{6}$$

[Expression 7]

$$E_{t+1} - E_t = f_E(\theta_t, \omega_t, E_t, L_t, \tau_t) \tag{7}$$

[Expression 8]

$$L_{t+1} - L_t = f_L(\theta_t, \omega_t, E_t, L_t, \tau_t) \tag{8}$$

Actually, the Fwd model 131 performs function learning at each time t by using present variables as a teacher signal and by using variables that are observed and executed at the next previous time t−1 as an input. In this way, the Fwd model 131 continues learning by being provided with a learning sample at each time. Therefore, although many errors may occur in an early stage of prediction by the Fwd model 131, the accuracy of function approximation can be increased and prediction errors can be reduced after the Fwd model 131 obtains a plurality of experiences over a long time.

In a neural network and the like, prediction can be asymptotically performed by sequentially giving samples in the same way. However, in this case, SVR having a high generalization ability and a short convergence period is used. The SVR is a learning machine of a normal batch type. As an algorithm of the incremental learning, there is suggested AOSVR (accurate online support vector regression) described in Junshui Ma and James Theiler and Simon Perkins, "Accurate on-line support vector regression", Neural Computation, vol. 15, 11, pp. 2683-2703, 2003, MIT Press. The AOSVR can be used in the Fwd model 131. As a kernel of the SVR, a Gaussian kernel can be used.

Next, planning performed by the planner 133 is described.

A goal state required for planning by the planner 133 is given by the goal generator 132. Herein, for example, $\theta d = \pi$ (that is, $\theta = 180°$ where the arm is raised upward to the maximum extent) is given as a goal state. The planner 133 generates a torque sequence given as actions to be taken from the present state $S_0$ to the goal state through search.

In the search executed by the planner 133, heuristic search is used. Specifically, actions of the autonomous agent 1 are calculated by using an algorithm of A*search, which is described in J. Pearl, "Heuristics: Intelligent Search Strategies for Computer Problem Solving", Addison-Wesley, 1985.

Hereinafter, the algorithm of A*search is briefly described.

(a) First, a subsequent state that occurs if all possible actions in a present state are taken is obtained, the subsequent state is regarded as a new node, and a link is made from a present node to the new node (herein, the Fwd model 131 is used to obtain the subsequent state).

(b) If the subsequent state or the new node mentioned in (a) is identical to (or approximate to) another state (node) that has already been achieved, the costs to achieve the respective nodes are compared with each other (e.g., temporal steps for achievement).

(c) After the comparison, the node of lower cost is adopted and the node of higher cost is abandoned.

(d) If new nodes are generated in the subsequent state, that is, if the node linked in (a) is different from any other states that have already been achieved or if the node linked in (a) is adopted as a lower-cost node in (c), the evaluation function of the following expression (9) is calculated in the respective new nodes and the nodes are added to candidate nodes.

[Expression 9]

$$f(n)=g(n)+\alpha \cdot h(n) \qquad (9)$$

In expression (9), "g(n)" represents a path cost from a start node to a present node, "h(n)" represents an estimated cost of a path from the present node to a goal node (a distance to the goal in a state space is used), and "α" represents a weight coefficient (allocation of the above-mentioned two costs).

(e) A node of the smallest evaluation function is selected from among all of the candidate nodes and sets it as a present node.

(f) The node selected as the present node in (e) is omitted from the candidate nodes.

(g) The above-described steps (a) to (f) are repeated until the state becomes identical to (or sufficiently approximate to) the goal state.

The controller 134 controls behavior, that is, controls execution of actions based on a behavior sequence, on the basis of the planning by the planner 133. The autonomous agent 1 can achieve the goal state through repetition of planning by the planner 133 and execution of the plan (behavior) by the controller 134. The repetition of planning by the planner 133 and execution by the controller 134 is described below with reference to FIGS. 7 to 9E.

In a state space 141 shown in FIG. 7 and FIGS. 8A to 8E, the virtual axis indicates speed ω and the horizontal axis indicates position θ. A start position 151 is a position where the arm 31 is directed completely downward (θ=0(0°)) and the speed is 0 in a real space (a position where both vertical and horizontal axes indicate 0). On the other hand, a goal position 152 is a position where the arm 31 is directed completely upward (θ=π(180°)) and the speed is 0 in a real space. The goal position 152 is shown by a black circle. Needless to say, π=−π is satisfied in the state space 141. Although only one black circle is shown on the right of the state space 141, the position where θ=−π and ω=0 is equal to the goal position 152.

In FIGS. 7 to 8E, an operated node is indicated with a white circle, a candidate path is indicated with a solid line, and a candidate node or the top of a path is indicated with a cross.

Assume that a state where the arm is at rest downward (θ=0, ω=0) is given as an initial state $S_0$. In this case, if search is executed by using an accurate Fwd model 131 that has sufficiently learned, a path from the start position 151 toward the goal position 152 is searched for, as shown in FIG. 7. Then, the nodes increase in a (θ, ω) space as shown in FIGS. 8A to 8E. After a sufficient search has been done, the goal state can be achieved as shown in FIG. 8E.

More specifically, as shown in FIG. 7, the search starts from the start position 151, candidate paths are calculated on the basis of the operated nodes, and the top of each path is regarded as a candidate node. Among the candidate nodes, the node of the smallest evaluation function is regarded as a present node.

That is, on the basis of the algorithm of A*search, the planner 133 obtains a subsequent state that occurs if all possible actions in a present state (present node) are taken, regards the subsequent state as a new node, and makes a link from a present node to the new node. If the linked node is identical to or approximate to another state that has already been achieved, the costs to achieve the nodes are compared with each other and the node of lower cost is adopted whereas the node of higher cost is abandoned. If new nodes are generated in this way, the planner 133 calculates the evaluation function of the above expression (9) of the respective new nodes and adds the new nodes to the candidate nodes (the existing nodes remain). Then, the planner 133 selects a node of the smallest evaluation function, that is, the most reliable path, from among all of the candidate nodes, regards the selected node as a subsequent present node, omits the node selected as the present node from the candidate nodes, and further obtains a subsequent state that occurs if all possible actions in the new present node are taken.

After repeating the search in this manner, the search based on the algorithm of A*search ends and a plan is determined when a candidate node that is identical to or sufficiently approximate to the goal state is found.

FIGS. 8A to 8E show the relationship between expansion of nodes and time in a searching process to set a plan. FIG. 8A shows a state where sufficient time has not elapsed since a trial started. As the time elapses as shown in FIGS. 8B, 8C, and 8D, nodes increase in the (θ, ω) space. After search of sufficient time, a behavior sequence to reach the goal position 152 as the goal state can be obtained, as shown in FIG. 8E.

In the search illustrated in FIGS. 8A to 8E, a correct sequence can be obtained without any problem if the model of state transition is accurate. However, if an accurate model of state transition has not yet been obtained and the state transition is being learned by the Fwd model 131 (learning by the Fwd model 131 is still insufficient), the planner 133 disadvantageously generates a wrong sequence on the basis of wrong prediction generated by the Fwd model 131.

In that case, the autonomous agent 1 executes the plan generated on the basis of the wrong prediction. As a result, the autonomous agent 1 may change to an unexpected state. Even in such a case, the Fwd model 131 learns this execution result. That is, the Fwd model 131 learns a new input/output relationship (a present environment and prediction of an environment of next time to an action), and thus a prediction error is corrected as the learning progresses. Accordingly, when the planner 133 plans the behavior of the autonomous agent 1 again, the planner 133 can generate a plan that is different from the plan previously generated on the basis of the wrong prediction.

The Fwd model 131 uses a function approximator based on statistical learning. Thus, as the learning therein progresses, the accuracy of prediction of output to input approximate to learned input increases as well as the accuracy of prediction of output to learned input.

If the goal state cannot be achieved through execution of a plan, the present state of the autonomous agent 1 is different from the initial state. Therefore, a next behavior sequence from the present state to the goal state is planned on the basis of the prediction by the Fwd model 131 in which learning progressed, and the planned behavior sequence is executed. In this way, the prediction made by the Fwd model 131 becomes gradually accurate as planning and execution are repeated, so that the planner 133 becomes able to generate a behavior sequence to achieve the goal state.

Figure 9C:
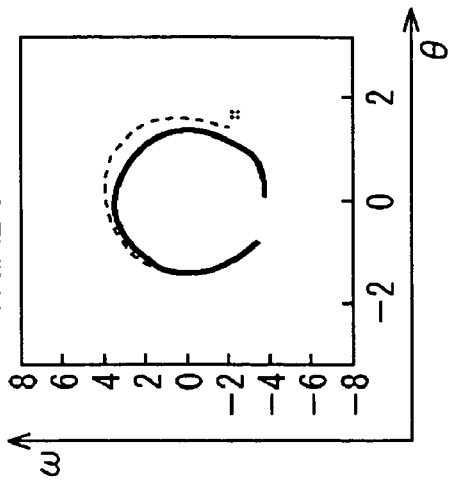
FIGS. 9A to 9E illustrate a procedure of obtaining a sequence to achieve a goal state through repetition of planning and execution.
Figure 9B:
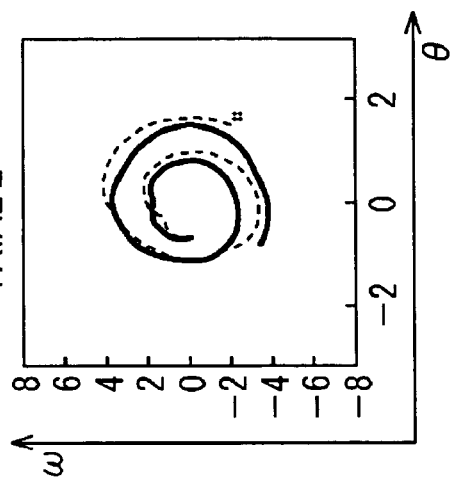
Figure 9E:
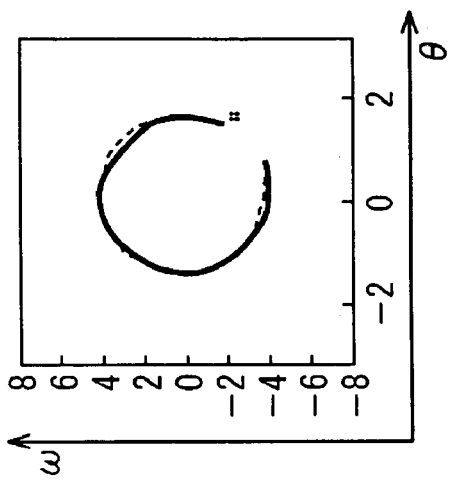

FIGS. 9A to 9E show an example where an error between a plan and an execution result reduces as the plan is repeatedly executed in a (θ, ω) space and a goal achieving sequence can be finally executed (in a fifth trial shown in FIG. 9E).

In FIGS. 9A to 9E, a planned behavior sequence and an actual behavior (execution) are plotted, with the vertical axis indicating speed ω and the horizontal axis indicating position θ as in FIGS. 7 to 8E. In each figure, the trace of the planned behavior sequence is drawn with a broken line and the trace of the execution is drawn with a solid line. An end of each broken line showing the plan (a position of "::") corresponds to a goal position.

Figure 9A:
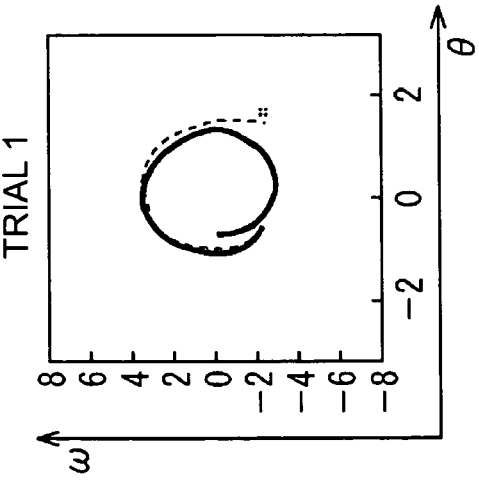

In a first trial (trial 1) shown in FIG. 9A, a difference can be seen between the plan and the execution.

If the plan was executed but did not succeed, that is, if the goal position was not achieved, another plan is set for the goal on the basis of the state after the first trial, and then a second trial is executed.

Figure 9D:
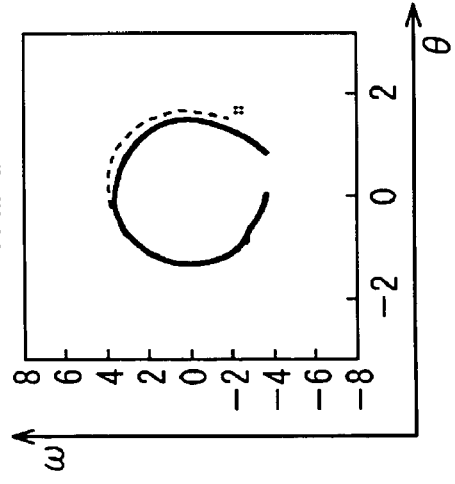

Likewise, a difference can be seen between the plan and execution result in the second trial (trial 2) shown in FIG. 9B, the third trial (trial 3) shown in FIG. 9C, and the fourth trial (trial 4) shown in FIG. 9D. However, since the Fwd model 131 learns results of the respective trials, the accuracy of prediction made by the Fwd model 131 gradually increases and the difference between the plan and execution result becomes smaller. In this way, a plan is regenerated for the goal every time a trial ends.

Finally, in the fifth trial (trial 5) shown in FIG. 9E, an error hardly occurs and a successful sequence can be obtained.

As described above, learning by the Fwd model 131 progresses through repetition of planning and execution, which increases the prediction accuracy. Accordingly, the planner 133 can plan a behavior sequence to achieve the goal state.

Next, learning performed by the controller 134 is described.

A function approximator based on statistical learning is used in learning by the controller 134. As the function approximator, the above-described SVR is used. If a successful sequence is executed, the controller 134 learns a relationship between each state from the initial state to the goal state and an action executed in that state as a function expressed by the following expression (10).

[Expression 10]

$$a_{t+1} = g_d(S_t) \quad (10)$$

Figure 10:
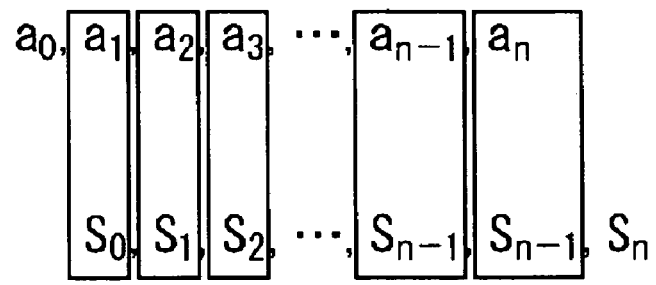
FIG. 10 illustrates a data relationship in a case where a relationship between each state from an initial state to a goal state and an action taken in the state is learned as a function.

FIG. 10 shows a relationship of data that is actually used in expression (10) in a state 0 to a state n.

By learning each pair surrounded by a rectangle shown in FIG. 10 (input/output in which the goal state is a fixed input), the controller 134 becomes able to determine an action at $+_1$ to be taken at subsequent time t+1 on the basis of the state observed at time t.

A function approximator based on statistical learning is used in learning by the controller 134, as described above. Therefore, by learning a successful sequence, the controller 134 can improve an action approximate to a learned path in control of actions taken thereafter.

That is, by allowing the controller 134 to repeatedly learn a plurality of successful sequences (successful experiences), the autonomous agent 1 can obtain a controller (control to be executed by the controller 134) capable of achieving a goal state from any state.

Figure 11:
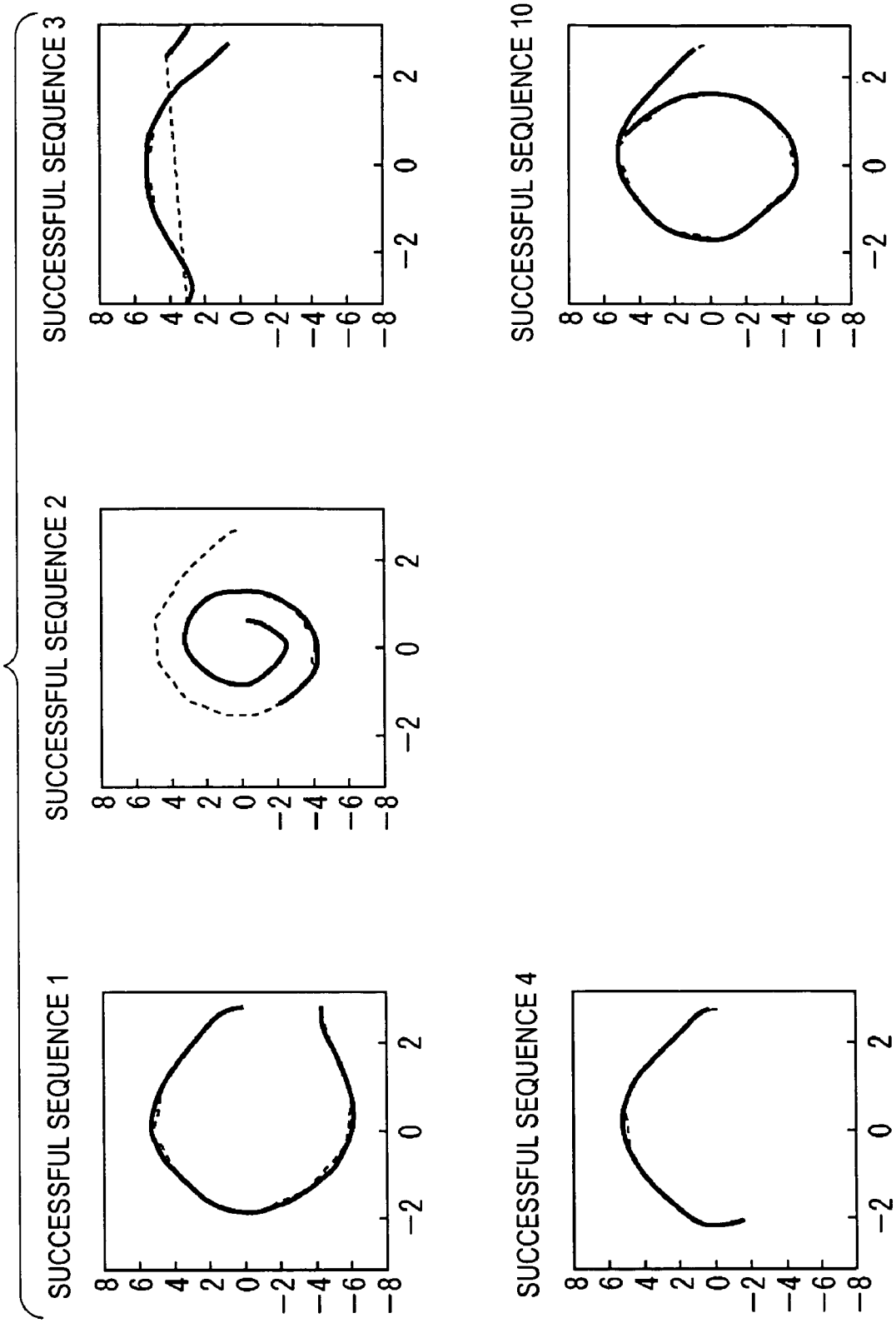
FIG. 11 shows successful sequences from a plurality of states to a goal state provided as learning samples.

For example, assume that a state where the arm 31 is raised upward to the maximum extent (θ=π(180°), ω=0) is given as a goal state. In this case, as shown in FIG. 11, successful sequences from a plurality of states to a goal state are sequentially given as learning samples. Accordingly, the controller 134 learns a configuration to achieve a goal state from an arbitrary state, such as phase diagrams shown in FIG. 12, that is, learns a set of successful sequences enabling achievement to a goal state from any position.

Figure 12:
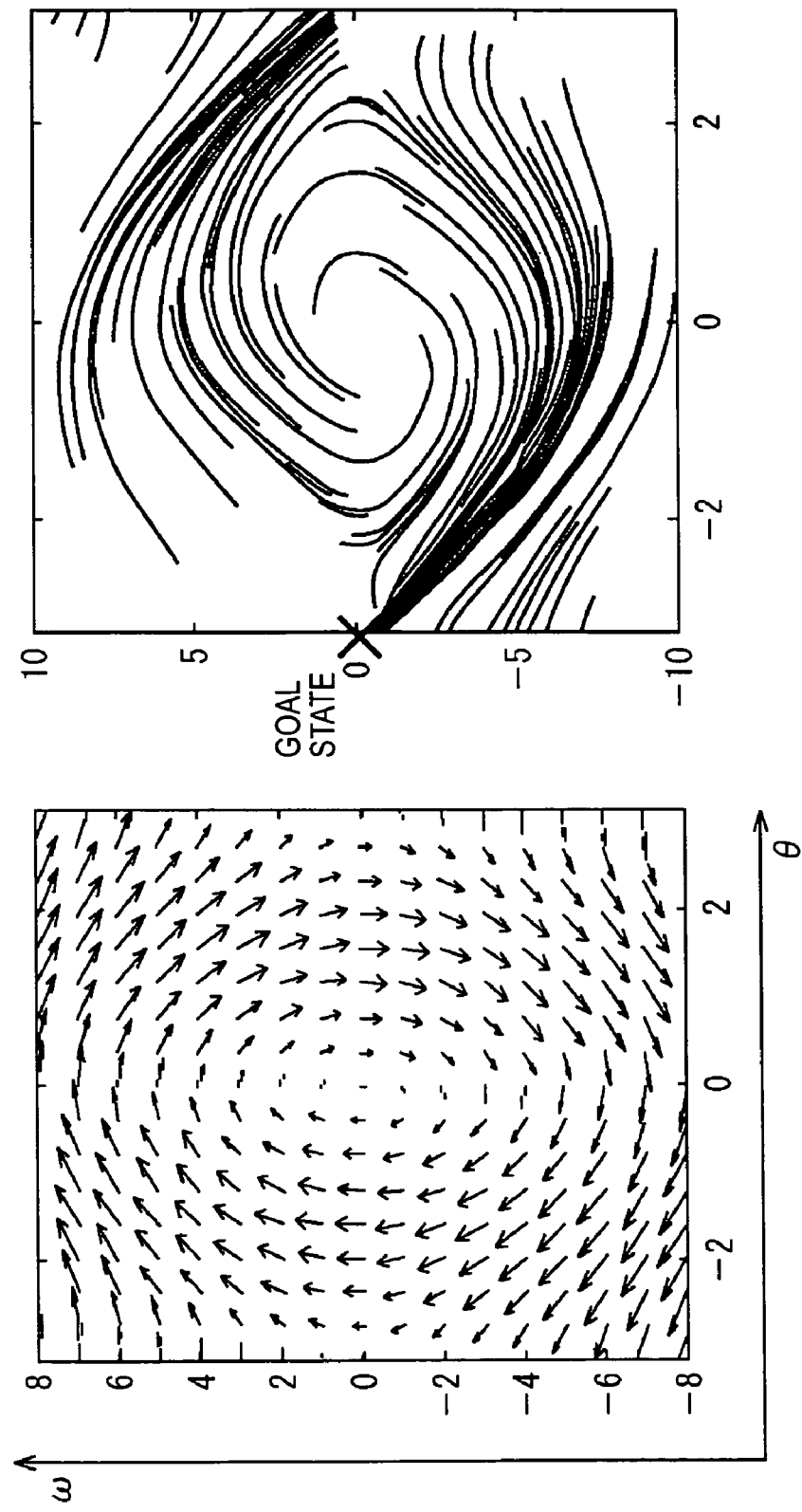
FIG. 12 shows a configuration from an arbitrary state toward a goal state.

Note that, π=−π is of course satisfied in a state space shown in FIGS. 11 and 12.

In the case of the autonomous agent 1, this function is specifically the function expressed by the following expression (11). By calculating a torque output at subsequent time t+1 by using the (θ, ω)) observed at time t, a raising sequence can be generated.

[Expression 11]

$$\tau_{t+1} = g_{\theta=\pi, \omega=0}(\theta_t, \omega_t) \quad (11)$$

When the controller 134 learns a function expressed by the following expression (12), in which a goal state is a parameter, in the same manner as in the above-described learning (when the controller 134 learns input/output in which a goal state and an environment are input and an action is output), a control g capable of achieving an arbitrary goal state from an arbitrary state can be obtained. In this case, a goal state generated by the goal generator 132 is sequentially changed and a plan is repeatedly generated and executed for each goal state, so that successful sequences for various goal states are experienced. Accordingly, a controller (control to be executed by the controller 134) capable of controlling behavior to achieve an arbitrary goal state from an arbitrary state can be obtained.

[Expression 12]

$$a_{t+1} = g(S_t, S_d) \quad (12)$$

Now, a process 1 executed by the autonomous agent 1 to which the present invention is applied is described with reference to the flowchart shown in FIG. 13.

In step S1, the goal generator 132 sets a goal and notifies the planner 133 of the goal state.

In step S2, the planner 133 plans a behavior sequence to achieve the goal set by the goal generator 132 on the basis of functions of difference equations to predict respective variables at time t+1 based on the variables at time t in the above-described expressions (5) to (8) predicted by the Fwd model 131. Then, the planner 133 supplies the behavior sequence to the controller 134.

More specifically, in a manner as described above with reference to FIGS. 7 to 8E, the planner 133 executes the algorithm of A*search. That is, the planner 133 obtains a subsequent state that occurs if all possible actions in the present state are taken. Then, the planner 133 makes a link to the subsequent state as a new node from the present node. If the newly linked node is identical to or approximate to another state that has already been achieved, costs to achieve these nodes are compared with each other, and the node of lower cost is adopted whereas the node of higher cost is abandoned. After new nodes are generated in this way, the evaluation function of the above expression (9) is calculated and the nodes are added to candidate nodes (existing candidate nodes remain). Then, among all of the candidate nodes, a node of the smallest evaluation function, that is, the most reliable path, is selected as a present node, and the selected node is omitted from the candidate nodes.

When any of the candidate nodes becomes identical to or approximate to the goal state after repetition of search, the search based on the algorithm of A*search ends and the plan is determined.

In step S3, the controller 134 starts to execute the behavior sequence planned by the planner 133. Specifically, if the autonomous agent 1 has the arm 31 described with reference to FIG. 3, the controller 134 controls the motor driver 52 in order to drive the DC motor 32 that rotates the arm 31 by applying a torque in a desired direction on the basis of the behavior sequence planned by the planner 133. The behavior sequence includes one or more actions.

In step S4, the Fwd model 131 obtains and records information indicating an environment that has changed due to execution of the plan in step S3 (an environment $s_t$ changed due to a taken action $a_t$). More specifically, for example, if the autonomous agent 1 has the arm 31 described with reference to FIG. 3, the Fwd model 131 observes the angle (θ) of the arm 31 with reference to a signal from the potentiometer 33, detects the angular velocity (ω) from the angle, records these values, and calculates and records the amount of change in energy E and the amount of lactic acid L described with reference to FIG. 2 on the basis of the amount of consumed power supplied from the power meter 53. The planner 133 can detect whether the bait 11 existing at a certain position (θE) could be obtained on the basis of input from the photosensor 35.

In step S5, the Fwd model 131 learns behavior and change in a state of the environment. More specifically, the Fwd model 131 learns change in a state of the environment caused by an action taken under control by the controller 134, that is, output to input indicted by difference equations described with reference to expressions (5) to (8).

In step S6, the controller 134 determines whether execution of the behavior sequence planned by the planner 133 has completed, that is, whether all actions included in the behavior sequence have been executed. If it is determined in step S6 that execution of the behavior sequence has not completed, the process returns to step S4 and the subsequent steps are repeated.

If it is determined in step S6 that the behavior sequence has completed, the process proceeds to step S7, where the controller 134 determines whether the goal has been achieved. More specifically, if the autonomous agent 1 has the arm 31 described with reference to FIG. 3, the controller 134 determines whether the arm 31 stopped at a position corresponding to the bait 11 (whether the arm 31 stopped after the top thereof has, reached the position of the photosensor 35 shown in FIG. 3 or the position of the conductive terminal 63 shown in FIG. 5).

If it is determined in step S7 that the goal has not been achieved, the process returns to step S2 and the subsequent steps are repeated. In other words, if the goal could not be achieved, the planner 133 plans another behavior sequence on the basis of the prediction made by the Fwd model 131. Since the Fwd model 131 has learned the input/output of the failure plan, the plan newly generated by the planner 133 on the basis of the prediction made by the Fwd model 131 is different from the previous one although the plan is made for the same goal, so that a plan that is more likely to achieve success can be generated. In this way, steps S2 to S6 are repeated until the goal is achieved, which allows the Fwd model 131 to learn more. Accordingly, a successful sequence can be obtained in the manner described with reference to FIGS. 9A to 9E.

If it is determined in step S7 that the goal has been achieved or that the plan has succeeded, the process proceeds to step S8, where the controller 134 learns the successful sequence. Then, the process returns to step S1 and the subsequent steps are repeated.

That is, the process returns to step S1, and a behavior sequence to achieve the same goal from a different initial state is planned. If planning and execution are repeated until the goal state is achieved, a controller (control to be executed by the controller 134) capable of controlling behavior to achieve a predetermined goal state from an arbitrary state can be obtained. If a plurality of different goals are set and if planning and execution are repeated until these goals are achieved, a controller (control to be executed by the controller 134) capable of controlling behavior to achieve an arbitrary goal state from an arbitrary state can be obtained.

The learning by the Fwd model 131 and the controller 134 progresses through this process. Finally, a controller (control to be executed by the controller 134) having a function of automatically generating actions to achieve a predetermined goal from an arbitrary state or automatically generating actions to achieve a goal from an initial state by being provided with the goal can be obtained.

As described above, when the present invention is applied, the goal generator 132 gives a goal state to the planner 133, the Fwd model 131 sequentially learns an input/output relationship of the agent, the planner 133 plans a behavior sequence by searching for a specific path to the goal state using the prediction made by the Fwd model 131, and the plan is executed under control by the controller 134. If the plan has succeeded and the goal state has been achieved, the controller 134 learns the path pattern (successful sequence). Through repetition of such learning, the autonomous agent 1 can obtain the controller 134 capable of automatically achieving a goal from an arbitrary state.

In other words, the Fwd model 131 constantly learns the relationship between an action taken by the agent and change in the environment (change in sensor input). Therefore, the prediction accuracy of the Fwd model 131 increases as even wrong plans are executed. The planner 133 makes a plan from the present state to the goal state by rehearsing the prediction made by the Fwd model 131. The controller 134 controls execution of actions included in the planned behavior sequence. If the planned behavior sequence has actually succeeded, the controller 134 leans the input/output relationship. Additionally, a function approximator based on statistical learning (e.g., support vector regression) is used in predictive learning by the Fwd model 131 and control learning by the controller 134. The planner 133 generates a behavior sequence by using a method of heuristic search (e.g., A*search).

That is, the Fwd model 131 can perform predictive learning while being released from curse of dimensionality by using a large-scale sample or the ability of a function approximator that is resistant to learning of high-dimensional input. Furthermore, even if an inadequate plan generated by an immature Fwd model 131 is executed, the Fwd model 131 can experience an unknown state space, so as to improve the prediction performance.

The planner 133 uses a method of heuristic search. Therefore, even if the dimension of input becomes high and the state space becomes large, combination explosion in search is less likely to occur compared to a case where Q-learning or dynamic programming is used.

Further, repetition of learning a successful sequence can generalize the controller 134.

When the present invention is applied, learning of control in which a goal state is a parameter of a continuous amount can be performed. Accordingly, a controller (control to be executed by the controller 134) capable of controlling behavior to achieve an arbitrary goal state from an arbitrary state can be obtained. Further, in the embodiment of the present invention, learning adapted to a human thinking pattern can be performed. As a result, a behavior pattern that can be easily understood by humans can be generated.

As described above, in the embodiment of the present invention, a pattern learning machine such as an SVM is used in learning in the Fwd model 131 and the controller 134 and a vast state space is efficiently searched by using heuristic search in order to be released from curse of dimensionality, so that a behavior sequence to achieve a goal can be autonomously generated. This procedure is based on a human thinking pattern, and thus the behavior can be easily understood by humans and a solution can be obtained within a practical time period.

In the above-described effective heuristic search, graph search is used as a searching method. Thus, behavior needs to be dealt as a finite number of discrete options. In the above-described example, search is executed by discretizing a torque output. Actually, the resolution of output becomes low by discretizing output. However, if dimensions of output increase (if an output space is vast), combination explosion occurs and the search cannot be efficiently performed even if each dimension is discretized. Therefore, in the above-described heuristic search, the algorithm can be applied only to an application having a small number of output options.

As described above, discretization of behavior is a problem in the heuristic search. On the other hand, in reinforcement learning, how to effectively use the knowledge obtained through learning is a great challenge.

Hereinafter, an autonomous behavior control model is described. In this model, an output that is automatically generated by a learned controller, that is, a finite number of samples generated by adding probabilistic perturbations (search) to the output using knowledge (discretization of behavior) is used in graph search.

In this autonomous learning control model, an output can be learned not as a discrete value but as a continuous value by applying continuous perturbations to the output that is automatically generated by the controller that performed learning. Further, even when an output space is vast, the performance can be maintained at an adequate level to perform search by setting only the vicinity of output based on knowledge as options.

Figure 14:
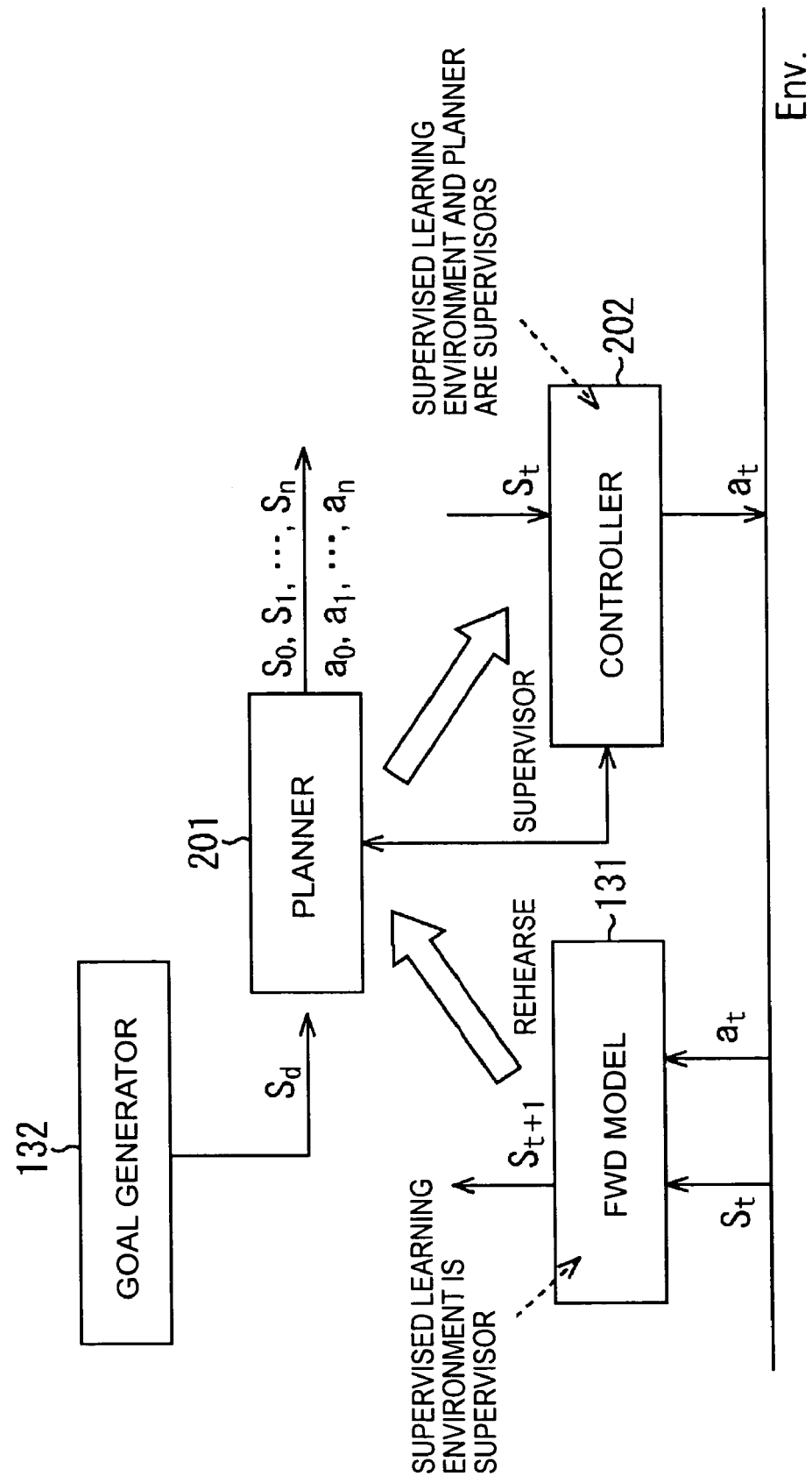
FIG. 14 shows another example of the autonomous behavior control model.

FIG. 14 is a functional configuration diagram showing a function of the controller 51 shown in FIG. 4 or 5 in a case where an output that is automatically generated by the controller that performed learning is used in graph search. In other words, FIG. 14 shows an example different from the basic configuration of the autonomous behavior control model of the autonomous agent 1 shown in FIG. 6. In FIG. 14, parts corresponding to those in FIG. 6 are denoted by the same reference numerals and the corresponding description is omitted.

As shown in FIG. 14, the basic configuration of the autonomous behavior control model in a case where an output automatically generated by the controller that performed learning is used in graph search is basically the same as that shown in FIG. 6 except that a planner 201 is provided instead of the planner 133 and that a controller 202 is provided instead of the controller 134.

The autonomous behavior control model mainly includes four modules: the Fwd model 131, the goal generator 132, the planner 201, and the controller 202. In FIG. 14, "Env." means an environment.

The planner 201 plans a behavior sequence to achieve a goal state from a present state. The above-described planner 133 plans a behavior sequence by using an algorithm of A*search. However, the planner 201 uses an action output value $a_t$ obtained by the learning controller 202 as an option of planning so as to use obtained knowledge in planning.

The goal state required for planning by the planner 201 is given by the goal generator 132. For example, assume that $\theta d=\pi$ ($\theta=180°$ where the arm is raised upward to the maximum extent) is given as a goal state as in the above-described case. In this case, the planner 201 generates a torque sequence including actions to be taken from the present state $S_0$ to the goal state by search on the basis of an action output value calculated by the controller 202.

More specifically, the planner 201 supplies a present state $S_t$ and a goal $S_d$ to the controller 202 and receives an action output value $a_t$ calculated by the controller 202 on the basis of past learning. Then, the planner 201 samples perturbations to be added to the action output value $a_t$ in accordance with the probability distribution of the following expression (13).

[Expression 13]

$$N(0, \sigma) = \frac{1}{\sqrt{2\pi}\sigma} \exp\left(-\frac{x^2}{2\sigma^2}\right) \quad (13)$$

Herein, adding perturbations is a method of individually changing respective variables of a given solution at a predetermined probability so as to generate a new solution. That is, in this case, the action output value $a_t$ that is calculated by the controller 202 on the basis of past learning is changed in accordance with the probability distribution (normal distribution) of expression (13), so that a new solution, that is, a plurality of action samples are generated.

The added perturbations may be other than the probability distribution of expression (13) as long as they are sampled in accordance with the probability distribution whose peak is 0.

That is, the planner 201 samples N perturbations on the basis of the following expression (14) and newly sets N action output values $a_t'$ (action options).

[Expression 14]

$$a'_t = a_t + N(0, \sigma) \quad (14)$$

The N perturbations include a case where $a_t'=a_t+0$ in expression (14), that is, the action output value $a_t$.

The planner 201 obtains a subsequent state that occurs if N actions are taken by using the Fwd model 131, regards the subsequent state as a new node, and makes a link to the new node from the present node.

Then, as in the above-described case of planning a behavior sequence using an algorithm of A*search, if the subsequent state is identical to another state that has already been achieved or if the distance between those states is equal to or lower than a threshold, achievement costs (temporal steps required for achievement) to those nodes are compared with each other. Then, the node of lower cost is adopted and the node of higher cost is abandoned. If a node is newly generated in the subsequent state, an evaluation function shown in expression (9) of the node is calculated and the node is added to candidate nodes.

Then, the planner 201 selects a node of the smallest evaluation value from among all of the candidate nodes, sets the selected node as a present node, and omits the present node from the candidate nodes.

The planner 201 repeats the above-described steps until obtaining a node that is identical to (or sufficiently approximate to) the goal state.

In this way, a state where the arm is at rest downward ($\theta=0$, $\omega=0$) is given as an initial state $S_0$ and search is executed by using an accurate Fwd model 131. Accordingly, as in the case described above with reference to FIGS. 7 to 8E, nodes expands in the ($\theta$, $\omega$) space. Then, after sufficient time has elapsed, the goal state can be achieved.

In the above-described planning using A*search performed by the planner 133, a subsequent state that occurs if all possible actions in a present state are taken is obtained and a link is made from the present node to the subsequent state as a new node. In contrast to this, in the planning performed by the planner 201, the planner 201 supplies the present state $S_t$ and the goal $S_d$ to the controller 202 and receives an action output value $a_t$ calculated by the controller 202 on the basis of past learning. Then, N perturbations to be added to the action output value $a_t$ are sampled in accordance with probability distribution, N action output values $a_t'$ are newly set, a subsequent state that occurs if the N actions are taken is regarded as a new node, and a link is made from the present node to the new node.

For example, assume that a state where the arm is at rest downward ($\theta=0$, $\omega=0$) is given as an initial state $S_0$. In this case, search starts from the start position 151 as shown in FIG. 7, the action output value $a_t$ calculated by the controller 202 on the basis of past learning is obtained, N perturbations to be added to the action output value $a_t$ are sampled in accordance with probability distribution, N action output values $a_t'$ are newly set, and the subsequent state is set. Then, a path from the start position 151 to the goal position 152 is searched for. As in the case described with reference to FIGS. 8A to 8E, nodes expands in the ($\theta$, $\omega$) space. After the search is performed for sufficient time, the goal state can be achieved as shown in FIG. 8E.

As described above, the controller 202 receives the present state $S_t$ and the goal state $S_d$ from the planner 201, calculates the action output value $a_t$ on the basis of past learning, and supplies the action output value $a_t$ to the planner 201.

Also, as the controller 134, the controller 202 executes learning by using the plan made by the planner 201 and the environment as a supervisor and controls actions taken by the autonomous agent 1. If the action taken by the autonomous agent 1 succeeded, the controller 202 learns the input/output relationship, that is, a sensor input indicating the environment of the autonomous agent 1 in the successful sequence executed toward the given goal and the action taken thereto.

In other words, the controller 202 controls behavior, that is, execution of actions based on a behavior sequence, on the basis of the planning performed by the planner 201. The autonomous agent 1 can achieve the goal state through repetition of planning by the planner 201 and execution of the plan (behavior) by the controller 202, as in the case described above with reference to FIGS. 9A to 9E. If the plan is successfully executed, the controller 202 learns an input/output relationship between the observed state and the selected action, with the goal state being fixed input.

As in the controller 134, a function approximator based on statistical learning is used in learning by the controller 202. The above-described SVR or the like is used as the function approximator. If a successful sequence is executed, the controller 202 learns a relationship between each state from the initial state to the goal state and an action taken in the state as the function shown in the above expression (10).

In other words, the autonomous agent 1 can obtain a controller (control to be executed by the controller 202) capable of achieving a goal state from any state, as described with reference to FIG. 12, by allowing the controller 202 to repeatedly learn a plurality of successful sequences (successful experiences) described with reference to FIG. 11.

The controller 202 can obtain a control g capable of achieving an arbitrary goal state from an arbitrary state if the controller 202 learns the function expressed by the above expression (12), in which a goal state is a parameter, in the same manner as in the above-described learning (when the controller 202 learns input/output in which a goal state and an environment are input and an action is output). That is, in this case, a goal state generated by the goal generator 132 is sequentially changed and a plan is repeatedly generated and executed to achieve the goal states, so that the controller 202 can obtain experiences of various successful sequences. At this time, the controller 202 learns an input/output relationship in which the goal state and the environment are input and an action is output.

In this example, the dimension of an action output is single of only torque output. Even if an action and perturbations added to the action are in N dimensions, the same method can be applied by performing a process in each dimension.

Particularly, when an action output is in high dimension, graph search is performed by adding perturbations to an action by using an action output of the controller 202. With this method, search can be preformed while preventing combination explosion and preventing the resolution of output from being low.

Figure 15:
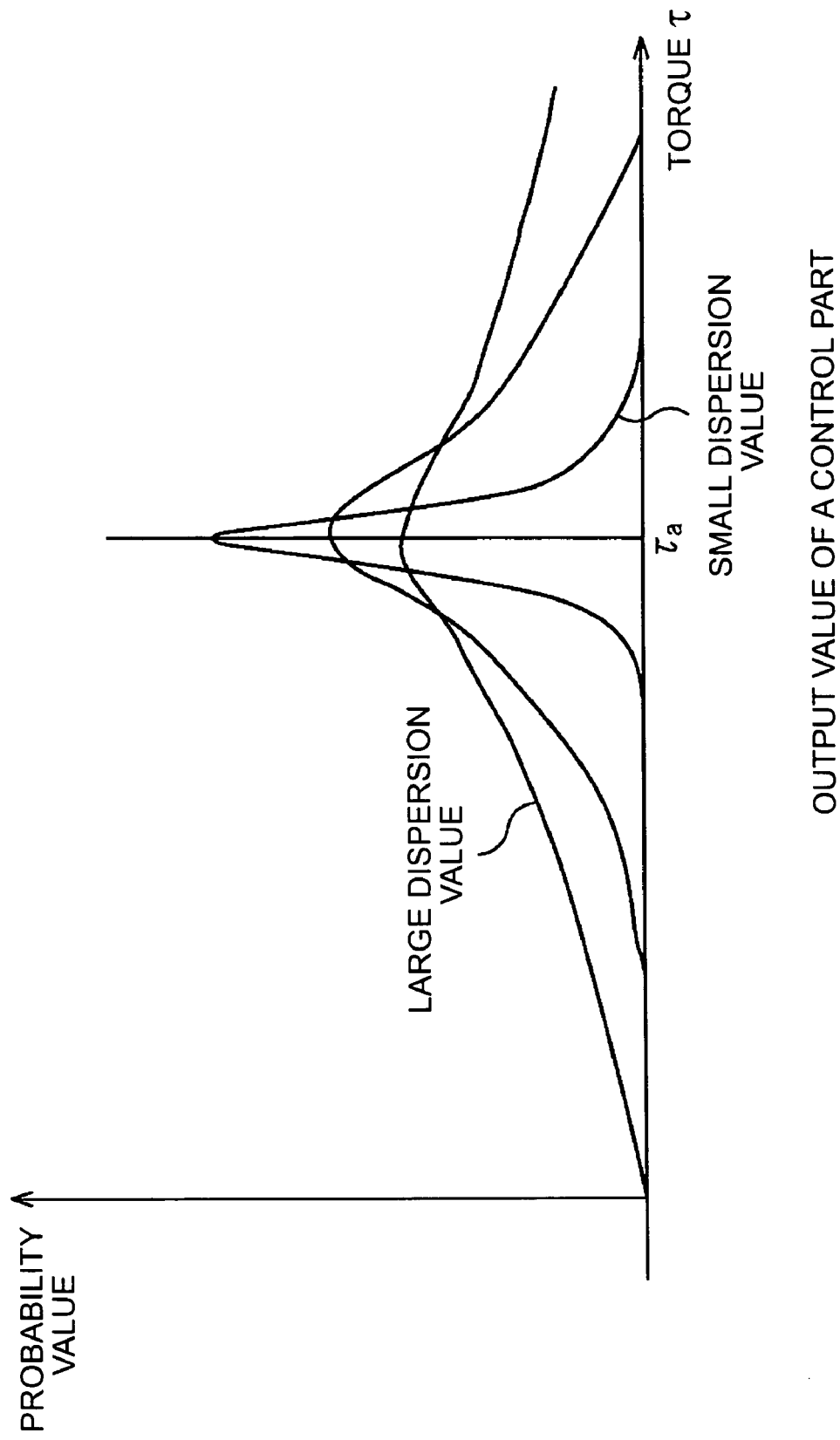
FIG. 15 illustrates probability distribution.

As shown in FIG. 15, which shows output values of the controller, when a dispersion value $\sigma$ of probability distribution of perturbation N is set to a small value, the range of perturbations is narrow, so that an importance is placed on output of the controller 202. On the other hand, when the dispersion value $\sigma$ is set to a large value, actions "a" can be uniformly sampled from a behavior space. When the dispersion value $\sigma$ is large, actions "a" are randomly sampled, and thus behavior of a continuous value can be learned through repetition compared to a case where a finite number of discrete actions are used as options.

That is, the planner 201 can control the balance between use of knowledge accumulated in the controller 202 and search by changing dispersion of perturbations. In other words, the planner 201 can use both output of the controller 202 and searching to planning by setting adequate dispersion and a suitable number of samples.

For example, it is preferable that the planner 201 executes many searches at an early stage of leaning by the controller 202 (dispersion value $\sigma$ is set to large) and places more importance on output of the controller 202 (dispersion value $\sigma$ is set to small) as the learning converges (knowledge is accumulated as the learning progresses).

Planning performed by the planner 201 generates a best behavior sequence and a state transition. In the state transition, if the difference between the behavior that is automatically generated by the controller 202 and the plan made by the planner 201 is small, that means learning by the controller 202 progresses, and thus the dispersion value a should be set to a smaller value. If the difference between the behavior that is automatically generated by the controller 202 and the plan made by the planner 201 is large, that means learning by the controller 202 does not progress so much. In that case, the dispersion value a should be set to a larger value so as to increase searches.

Hereinafter, two specific examples of a method for changing dispersion of perturbations are described.

Figure 16:
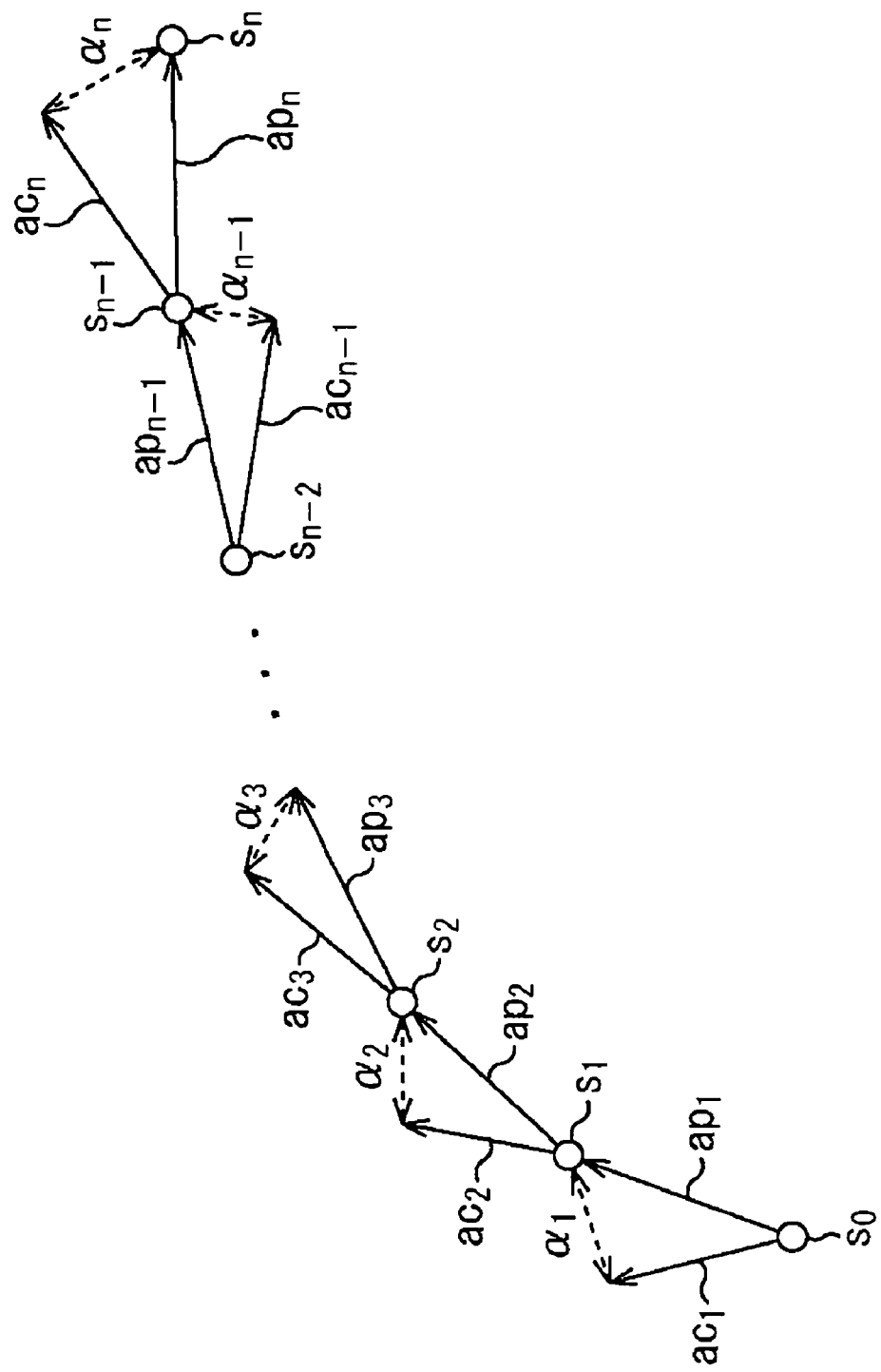
FIG. 16 illustrates a method for changing dispersion of perturbations.

A first method is described with reference to FIG. 16.

The controller 202 generates an action ac by using the above-described expressions (10) and (12) for each of a sequence of states $S_1$ to $S_n$ that are obtained from planning by the planner 201. The planner 201 compares respective environments predicted to be obtained by the respective actions ac generated by the controller 202 with respective environments predicted to be obtained by a behavior sequence ap planned by the planner 201 and calculates errors $\alpha_1$ to $\alpha_n$ therebetween. Then, the planner 201 sets dispersion of perturbations on the basis of the errors $\alpha_1$ to $\alpha_n$.

If the dispersion value of the errors $\alpha$ is smaller than a predetermined threshold, the planner 201 determines that output of the controller 202 is sufficiently reliable and decreases the dispersion value of perturbation by Δσ. If the dispersion value of the errors 60 is large, the planner 201 determines that output of the controller 202 is unreliable and increases the dispersion value of perturbation by Δσ. Alternatively, the dispersion value σ of perturbation may be set as a value proportional to an integrated value of the errors α with a predetermined coefficient.

Figure 17:
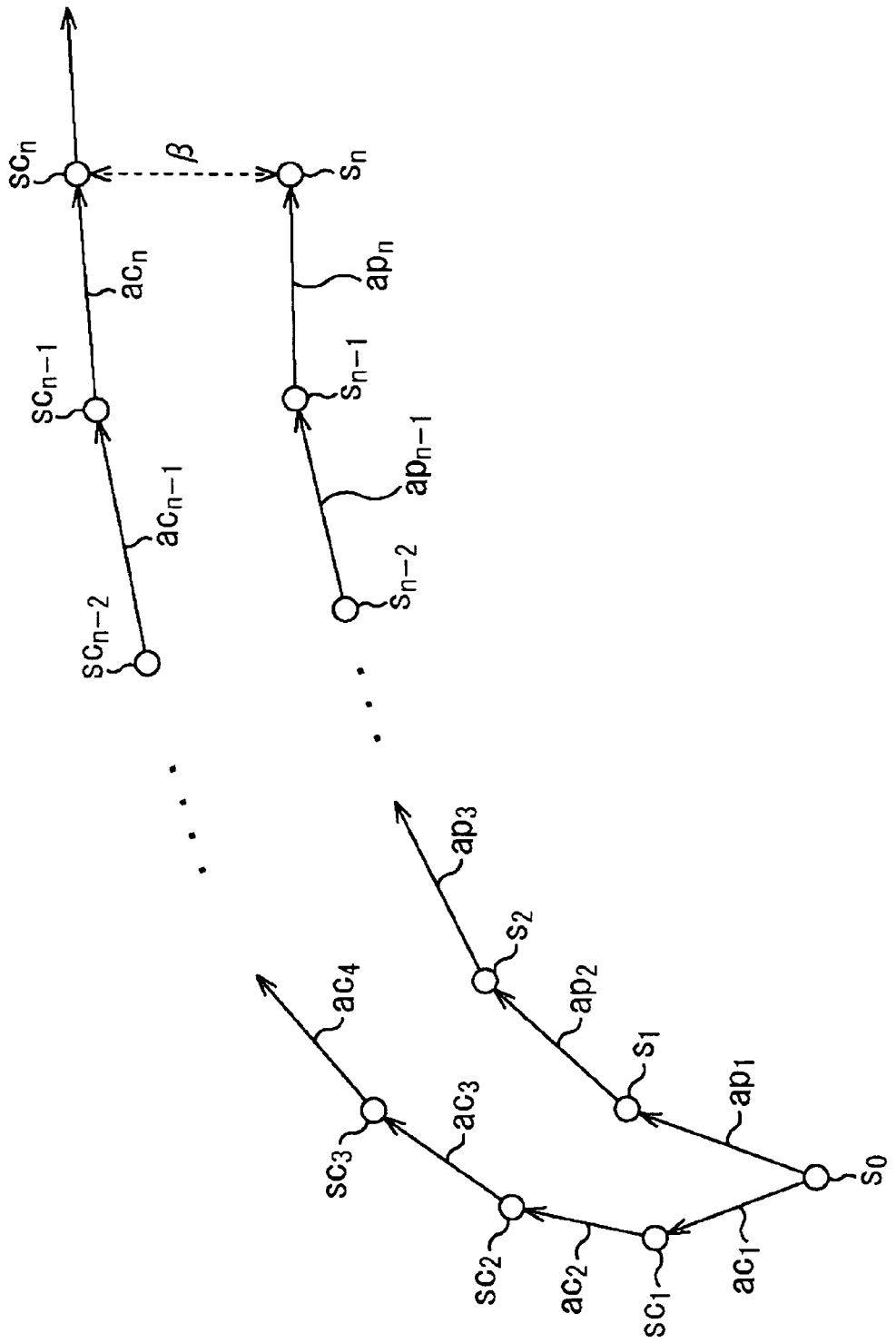
FIG. 17 illustrates a method for changing dispersion of perturbations.

Next, a second method is described with reference to FIG. 17.

The controller 202 generates an action $ac_1$ on the basis of an initial state $S_0$ by using the above-described expressions (10) and (12). The planner 201 can obtain a subsequent state $SC_1$ by supplying the action $ac_1$ to the Fwd model 131. Therefore, the planner 201 allows the controller 202 to generate an action $ac_2$ on the basis of the state $SC_1$. By supplying the action $ac_2$ to the Fwd model 131, the planner 201 obtains a subsequent state $SC_2$. By repeating this process n times, the planner 201 obtains a state $SC_n$ that is as approximate as possible to a goal state. Then, the planner 201 compares the state $SC_n$ achieved only by the ability of the controller 202 with a state $S_n$ achieved through a behavior sequence planned by the planner 201, and determines the dispersion value of perturbation on the basis of the comparison result.

For example, the planner 201 compares a distance β between the state $SC_n$ and the state $S_n$ with a predetermined threshold. If the value of β is smaller than the threshold, it is determined that output of the controller 202 is sufficiently reliable and the dispersion value of perturbation is decreased by Δσ. On the other hand, if the value of β is larger than the threshold, the dispersion value of perturbation is increased by Δσ. Alternatively, the dispersion value σ of perturbation may be set as a value proportional to β with a predetermined coefficient.

In the above-described manner, a learning result can be used in accordance with the stage of learning by the controller 202.

In other words, when the dispersion value of perturbation is maximum, a searching process that is almost the same as A*search is executed. When the dispersion value of perturbation is approximate to 0 (zero), a searching process is executed within a vicinity of the action output value $a_t$ obtained from the controller 202.

In the above-described method, knowledge obtained through learning by the controller 202, that is, an action output value $a_t$ for a present state $S_t$ and a goal $S_d$ is used. However, even if this method is applied to a state where the controller 202 does not learn at all, a behavior sequence to achieve a goal state can be obtained by performing search for a sufficient time.

The action output value $a_t$ that is obtained by giving the present state $S_t$ and the goal $S_d$ to the controller 202 that has not learned at all is not always correctly directed to the goal state. However, the range of search expands by setting the dispersion value σ of perturbation to a large value, and thus a behavior sequence to achieve the goal state can be obtained by performing search for a sufficient time.

Hereinafter, a process 2 executed by the autonomous agent 1 is described with reference to the flowchart shown in FIG. 18. In this process, search is performed by using knowledge obtained through learning by the controller 202, that is, the action output value $a_t$ corresponding to the present state $S_t$ and the goal $S_d$.

In step S21, the goal generator 132 sets a goal and notifies the planner 201 of the goal state.

Figure 19:
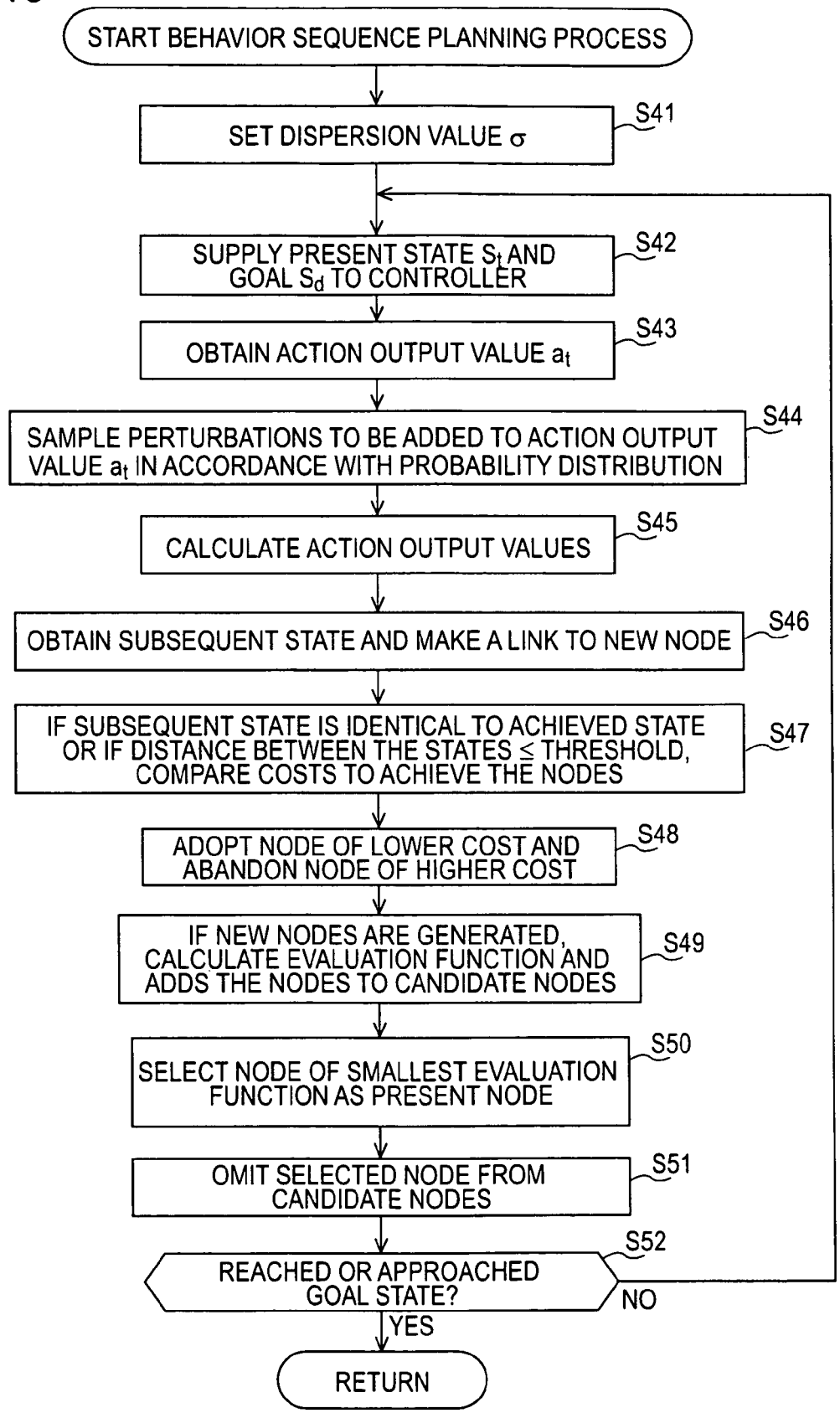
FIG. 19 is a flowchart illustrating a behavior sequence planning process.

In step S22, a process of planning a behavior sequence, which is described below with reference to FIG. 19, is executed.

In steps S23 to S28, a process that is basically the same as that in steps S3 to S8 shown in FIG. 13 is executed (the planner 201 instead of the planner 133 and the controller 202 instead of the controller 134 execute basically the same process).

The search executed by the autonomous agent 1 by using the knowledge obtained through learning by the controller 202, that is, using the action output value $a_t$ corresponding to the present state $S_t$ and the goal $S_d$ is different from A*search in the method of planning a behavior sequence. However, this process is the same as that described with reference to FIG. 13 in execution of a planned behavior sequence, obtainment and recording of an environment that changes in accordance with execution of the behavior sequence, learning of behavior and change in state of the environment, determination whether a goal has been achieved, and learning of a successful sequence, and also has the same effect and advantages.

Figure 18:
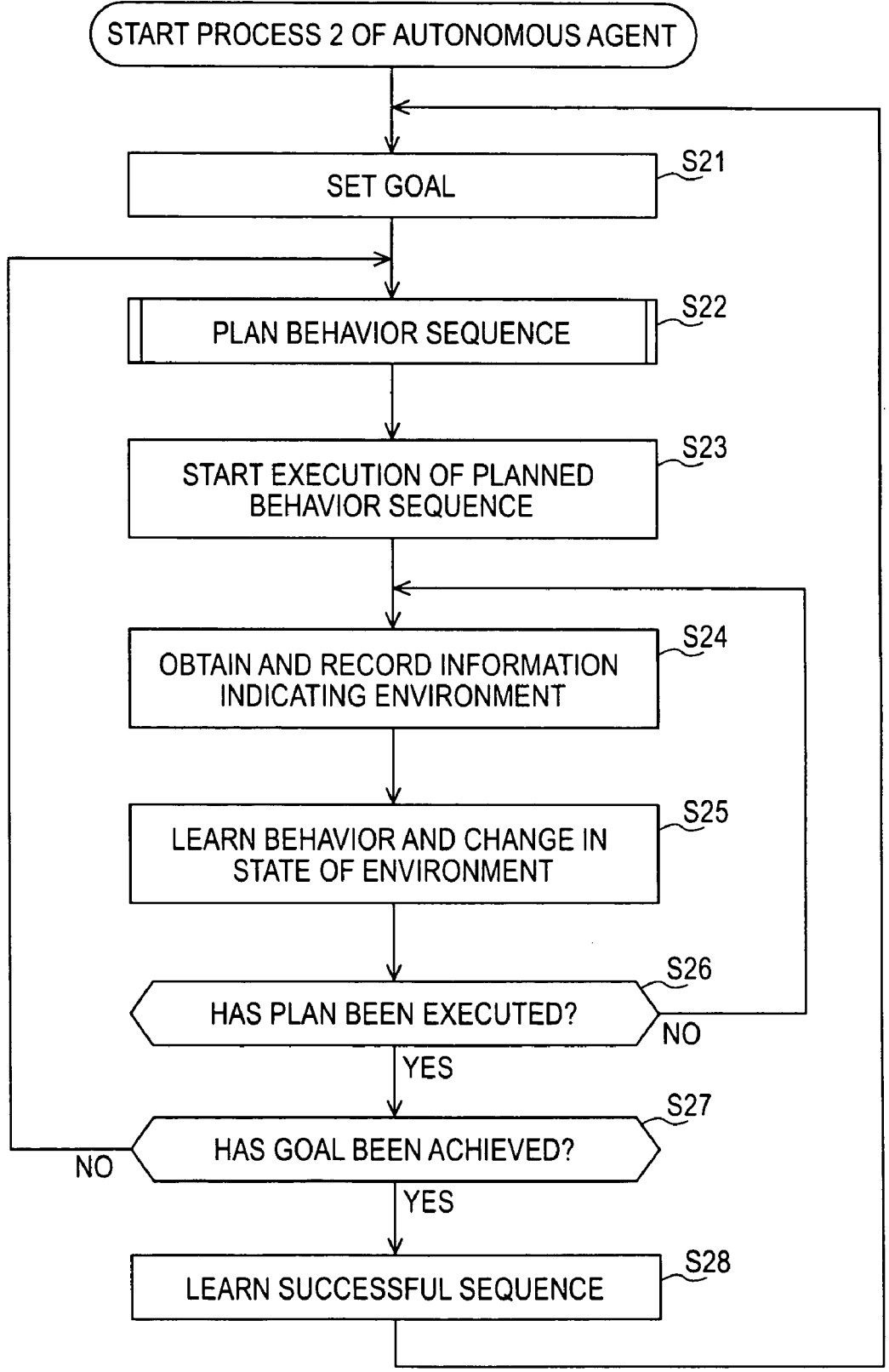
FIG. 18 is a flowchart illustrating a process 2 executed by the autonomous agent according to the embodiment of the present invention.

Next, the process of planning a behavior sequence executed in step S22 in FIG. 18 is described with reference to the flowchart shown in FIG. 19.

In step S41, the planner 201 sets a dispersion value a of perturbation to be added to the action output value at obtained from the controller 202. Specifically, the planner 201 sets the dispersion value σ to a large value at a first execution. At a second execution and thereafter, the planner 201 compares the behavior sequence that was planned by the planner 201 at the previous execution with a behavior automatically generated by the controller 202 as in the manner described above with reference to FIG. 16 or 17. If the difference therebetween is small, it is determined that learning by the controller 202 progresses, so that the dispersion value σ is set to a smaller value. If the difference is large, it is determined that learning by the controller 202 does not progress so much, so that the dispersion value σ is set to a larger value and more searches are performed.

In step S42, the planner 201 supplies the present state $S_t$ and the goal $S_d$ to the controller 202.

In step S43, the controller 202 calculates an action output value $a_t$ on the basis of the present sate $S_t$ and the goal $S_d$ supplied from the planner 201 in step S42, and supplies the action output value $a_t$ to the planner 201. The planner 201 obtains the action output value $a_t$ calculated by the controller 202.

In step S44, the planner 201 samples N perturbations to be added to the action output value $a_t$ obtained in step S43 in accordance with the probability distribution obtained in step S41 by using the above-described expression (13).

In step S45, the planner 201 further calculates N action output values by using the N perturbations sampled in step S44 in accordance with expression (14) (when $a_t'=a_t+0$ is satisfied in expression (14), including the action output value $a_t$).

In step S46, the planner 201 obtains a subsequent state that occurs if the N actions are taken by using the Fwd model 131, regards the subsequence state as a new node, and makes a link to the new node from the present node.

In step S47, the planner 201 determines whether the subsequent state obtained in step S46 is identical to another state that has already been achieved or whether the distance between the states is equal to or shorter than a threshold. If the distance between the states is equal to or shorter than the threshold, the planner 201 compares costs to achieve those nodes.

In step S48, the planner 201 adopts the node of lower cost and abandons the node of higher cost as a result of comparison of the achievement costs in step S47.

In step S49, if new nodes are generated as subsequent states, the planner 201 calculates evaluation functions, which have been described above with reference to expression (9), of the respective new nodes, and adds the new nodes to candidate nodes.

In step S50, the planner 201 selects a node of the smallest evaluation function from among all of the candidate nodes and sets the selected node as a present node.

In step S51, the planner 201 omits the node selected as the present node in step S50 from the candidate nodes.

In step S52, the planner 201 determines whether the present node has reached or approached the goal state. If it is determined in step S52 that the present node has not reached or approached the goal state, the process returns to step S42, and the subsequent steps are repeated. If it is determined in step S52 that the present node has reached or approached the goal state, planning of the behavior sequence completes, so that the process returns to step S22 in FIG. 18 and proceeds to step S23.

With this process, the controller that learned (controller 202) can be used in planning.

By performing probabilistic sampling (by using N perturbations obtained based on the dispersion value σ), a searchable number of options can be extracted to perform search, so that the problem of combination explosion in search caused due to too many action options can be solved.

As described above, in the autonomous agent according to the embodiment of the present invention, the efficiency of search can be significantly increased by using the knowledge obtained through learning in planning (by using actions generated by the controller 202 as action options of heuristic search in the planner 201).

If the dimension of action output is high when a state space (action value space) is uniformly made discrete, the discrete actions (action options) become too many and search cannot be performed. However, by performing probabilistic sampling on actions generated by the controller, the number of options can be controlled regardless of the dimension of an action space.

That is, search is performed by adding perturbations to an action generated by the controller, the perturbations to be added are sampled on the basis of probability distribution (e.g., normal distribution) whose peak is 0, and the samples are used as a finite number of action options in search. Accordingly, the knowledge of the controller can be used.

The action options are sampled from a continuous space. Thus, the controller can learn output of a continuous value, not actions that are discretized with a fixed value. Therefore, the controller that has learned well can perform more accurate control compared to the controller that has learned output of a discrete value.

By applying the present invention, the balance between use of knowledge and search can be controlled by a parameter (dispersion value σ) of probability distribution of perturbations to be added. The parameter of the probability distribution can be set in accordance with the progress in learning by the controller. The progress in learning by the controller can be estimated on the basis of an error between planning performed by the planner and the behavior automatically generated by the controller.

The above-described series of processes can be executed by software or hardware having the same function. When the software is used, the program constituting the software is installed from a recording medium into a computer incorporated in dedicated hardware or a multi-purpose personal computer capable of executing various functions by being installed with various programs.

The recording medium is, for example, the removable medium 43 shown in FIG. 4 that is distributed to provide a program to a user and that contains a program. Examples of the removable medium 43 includes a magnetic disk (including a flexible disk), an optical disc (including a CD-ROM (compact disc read only memory) and a DVD (digital versatile disc)), a magneto-optical disc (including an MD (Mini Disc®)), and a semiconductor memory.

In this specification, the steps describing a program recorded on a recording medium may be executed in time series in accordance with the described order. Alternatively, the steps may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A behavior control apparatus to control behavior of a device capable of sensing a state of an environment and selecting an action on the basis of a sensing result, the behavior control apparatus comprising:
   predicting means for learning the action and change in the state of the environment and predicting change in the state of the environment caused by a predetermined action on the basis of the learning;
   planning means for planning a behavior sequence to achieve a goal state from a present state on the basis of the prediction made by the predicting means; and
   control means for controlling each action of the behavior sequence planned by the planning means and learning an input/output relationship if the goal state is achieved through the action,
   wherein the planning means adds predetermined one or more perturbations to the action output from the control means to generate samples and uses the samples as action options for search, and the planning means changes a dispersion value of a probability distribution of the perturbations based on progress in learning by the control means.

2. The behavior control apparatus according to claim 1, further comprising:
   goal state giving means for giving a goal state in accordance with a task to the planning means.

3. The behavior control apparatus according to claim 1, wherein the predicting means learns the action and change in the state of the environment in both cases where the goal state is achieved and is not achieved by the action controlled by the control means in accordance with the behavior sequence planned by the planning means.

4. The behavior control apparatus according to claim 1, wherein the predicting means uses function approximation in the learning.

5. The behavior control apparatus according to claim 4, wherein the function approximation is support vector regression.

6. The behavior control apparatus according to claim 1, wherein the control means uses function approximation to learn the input/output relationship.

7. The behavior control apparatus according to claim 6, wherein the function approximation is support vector regression.

8. The behavior control apparatus according to claim 1, wherein the planning means plans the behavior sequence by using a method of heuristic search.

9. The behavior control apparatus according to claim 8, wherein the method of heuristic search is A*search.

10. The behavior control apparatus according to claim 8, wherein the control means receives input of a present environment and the goal state and outputs the action, and wherein the planning means plans the behavior sequence on the basis of the action output from the control means.

11. The behavior control apparatus according to claim 1, wherein the planning means uses the perturbations based on the probability distributing in which zero is a peak.

12. The behavior control apparatus according to claim 11, wherein the planning means compares a first environment predicted to be obtained through respective actions of the behavior sequence that is planned previous time with a second environment predicted to be obtained through the actions output from the control means in response to input of the environment and the goal state, calculates dispersion of errors between the first and second environments, decreases a dispersion value of the probability distribution if the dispersion of the errors is smaller than a predetermined threshold, and increases the dispersion value of the probability distribution if the dispersion of the errors is larger than the predetermined threshold.

13. The behavior control apparatus according to claim 11, wherein the planning means compares a first environment predicted to be obtained through respective actions of the behavior sequence that is planned previous time with a second environment predicted to be obtained through the actions output from the control means in response to input of the environment and the goal state, calculates an integrated value of errors between the first and second environments, and sets a dispersion value of the probability distribution to a value proportional to the integrated value of the errors.

14. The behavior control apparatus according to claim 11, wherein the planning means calculates an error between a first environment predicted to be obtained as a result of execution of the behavior sequence that is planned previous time and a second environment predicted to be achieved as a result of change in the environment predicted by the predicting means on the basis of the action output from the control means, decreases a dispersion value of the probability distribution if the error is smaller than a predetermined threshold, and increases the dispersion value of the probability distribution if the error is larger than the predetermined threshold.

15. The behavior control apparatus according to claim 11, wherein the planning means calculates an error between a first environment predicted to be obtained as a result of execution of the behavior sequence that is planned previous time and a second environment predicted to be achieved as a result of change in the environment predicted by the predicting means on the basis of the action output from the control means, and sets a dispersion value of the probability distribution to a value proportional to the error.

16. The behavior control apparatus according to claim 1, wherein the planning means increases the dispersion value of the probability distribution if a difference between the state of the environment and a plan made by the planning means is large, and the planning means decreases the dispersion value of the distribution if the difference between the state of the environment and the plan mage by the planning means is small.

17. A behavior control method for a behavior control apparatus to control behavior of a device capable of sensing a state of an environment and selecting an action on the basis of a sensing result, the behavior control method comprising:
  learning the action and change in the state of the environment using at least one hardware sensor;
  planning a behavior sequence to achieve a goal state from a present state by using prediction based on the learning in the learning;
  controlling each action of the behavior sequence planned in the planning; and
  learning an input/output relationship if the goal state is achieved through the action controlled in the controlling,
  wherein the planning includes adding predetermined one or more perturbations to each action controlled by the controlling to generate samples and using the samples as action options for search, and changing a dispersion value of a probability distribution of the perturbations based on progress in the learning.

18. The behavior control method according to claim 17, wherein the planning includes increasing the dispersing value of the probability distribution if a difference between the state of the environment and a plan mage by the planning is large, and decreasing the dispersion value of the distribution if the difference between the state of the environment and the plan made by the planning is small.

19. A physical computer readable medium including computer executable instructions, wherein the instructions, when executed by a processor, cause the processor to perform a method of controlling behavior of a device capable of sensing a state of an environment and selecting an action on the basis of a sensing result, the method comprising:
  learning the action and change in the state of the environment using at least one hardware sensor;
  planning a behavior sequence to achieve a goal state from a present state by using prediction based on the learning in the learning;
  controlling each action of the behavior sequence planned in the planning; and
  learning an input/output relationship if the goal state is achieved through the action controlled in the controlling,
  wherein the planning includes adding predetermined one or more perturbations to each action controlled by the controlling to generate samples and using the samples as action options for search, and changing a dispersion value of a probability distribution of the perturbations based on progress in the learning.

20. The physical computer readable medium according to claim 19, wherein the planning includes increasing the dispersion value of the probability distribution if a difference between the state of the environment and a plan made by the planning is large, and decreasing the dispersion value of the distribution if the difference between the state of the environment and the plan made by the planning is small.

21. A behavior control apparatus to control behavior of a device capable of sensing a state of an environment and selecting an action on the basis of a sensing result, the behavior control apparatus comprising:
  a predicting unit configured to learn the action and change in the state of the environment and predict change in the state of the environment caused by a predetermined action on the basis of the learning, the predicted unit including at least one hardware sensor to determine a state of the environment of the apparatus;
  a planning unit configured to plan a behavior sequence to achieve a goal state from a present state on the basis of the prediction made by the predicting unit; and a control unit configured to control each action of the behavior sequence planned by the planning unit and learn an input/output relationship if the goal state is achieved through the action, wherein the planning unit is configured to add predetermined one or more perturbations to each action controlled by the control unit to generate samples and uses the samples as action options for search, and to change a dispersion value of a probability distribution of the perturbations based on progress in learning by the control unit.

22. The behavior control apparatus according to claim 21, wherein the planning unit is configured to increase the dispersion value of the probability distribution if a difference between the state of the environment and a plan made by the planning unit is large, and the planning unit is configured to decrease the dispersion value of the distribution if the difference between the state of the environment and the plan made by the planning unit is small.

* * * * *